United States Patent
Sajedi

(10) Patent No.: US 11,054,237 B2
(45) Date of Patent: Jul. 6, 2021

(54) ULTRA-LIGHT AND ULTRA-ACCURATE PORTABLE COORDINATE MEASUREMENT MACHINE WITH UNIQUE BASE PLATE ARRANGEMENT

(71) Applicant: SA08700334, Grand Cayman (KY)

(72) Inventor: Allen Sajedi, Orlando, FL (US)

(73) Assignee: SA08700334, Grand Cayman (KY)

( * ) Notice: Subject to any disclaimer, the term of this patent is extended or adjusted under 35 U.S.C. 154(b) by 173 days.

(21) Appl. No.: 16/374,895

(22) Filed: Apr. 4, 2019

(65) Prior Publication Data
US 2020/0318940 A1 Oct. 8, 2020

(51) Int. Cl.
*G01B 5/008* (2006.01)

(52) U.S. Cl.
CPC ................... *G01B 5/008* (2013.01)

(58) Field of Classification Search
CPC .................... G01B 5/008; G01B 7/008
USPC ........................................... 33/503
See application file for complete search history.

(56) References Cited

U.S. PATENT DOCUMENTS

| | | | |
|---|---|---|---|
| 4,888,877 A | 12/1989 | Enderle et al. | |
| 5,408,754 A * | 4/1995 | Raab | G01B 5/008 33/503 |
| 5,596,189 A | 1/1997 | Orton | |
| 5,611,147 A | 3/1997 | Raab | |
| 5,829,148 A | 11/1998 | Eaton | |
| 6,170,358 B1 | 1/2001 | Hunter et al. | |
| 6,219,928 B1 | 4/2001 | Raab et al. | |
| 6,374,198 B1 | 4/2002 | Schifa et al. | |
| 6,519,860 B1 | 2/2003 | Bieg | |
| 6,892,465 B2 | 5/2005 | Raab et al. | |
| 6,920,697 B2 | 7/2005 | Raab et al. | |
| 6,935,036 B2 | 8/2005 | Raab et al. | |
| 6,957,496 B2 | 10/2005 | Raab et al. | |
| 6,965,843 B2 | 11/2005 | Raab et al. | |
| 6,988,322 B2 | 1/2006 | Raab et al. | |
| 7,050,930 B2 | 5/2006 | Raab et al. | |
| 7,051,450 B2 | 5/2006 | Raab et al. | |
| 7,069,664 B2 | 7/2006 | Raab et al. | |
| 7,073,271 B2 | 7/2006 | Raab et al. | |

(Continued)

FOREIGN PATENT DOCUMENTS

WO WO 2018/191632 10/2018

OTHER PUBLICATIONS

P.A. Orton et al., *Automatic Self-Calibration of an Incremental Motion Encoder*, IEEE Instrument and Measurement Technology Conference, Budapest, Hungary, May 21-23, 2001, at 1614.

*Primary Examiner* — Christopher W Fulton
(74) *Attorney, Agent, or Firm* — Renner, Otto, Boisselle & Sklar, LLP

(57) ABSTRACT

A coordinate measurement machine (CMM) includes a manually-positionable articulated arm having first and second ends. The articulated arm includes a plurality of arm segments and a plurality of rotary joints, and an electrical circuit including a main printed circuit board and a plurality of encoder printed circuit boards. The electrical circuit has at least some portions disposed within the plurality of arm segments. The first end includes a connector configured to connect to a measurement probe. The second end includes a base plate for mounting the CMM. The base plate has a cavity with a bottom opening. The main printed circuit board is disposed horizontally within the cavity.

20 Claims, 18 Drawing Sheets

(56) References Cited

U.S. PATENT DOCUMENTS

| | | |
|---|---|---|
| 7,246,030 B2 | 7/2007 | Raab et al. |
| 7,269,910 B2 | 9/2007 | Raab et al. |
| 7,430,068 B2 | 9/2008 | Becker et al. |
| 7,519,493 B2 | 4/2009 | Atwell et al. |
| 7,624,510 B2 | 12/2009 | Ferrari |
| 7,733,544 B2 | 6/2010 | Becker et al. |
| 7,735,234 B2 | 6/2010 | Briggs et al. |
| 7,743,524 B2 | 6/2010 | Eaton et al. |
| 7,774,949 B2 | 8/2010 | Ferrari |
| RE42,055 E | 1/2011 | Raab et al. |
| 7,881,896 B2 | 2/2011 | Atwell et al. |
| 8,015,721 B2 | 9/2011 | Eaton et al. |
| 8,122,610 B2 | 2/2012 | Tait et al. |
| 8,145,446 B2 | 3/2012 | Atwell et al. |
| 8,336,220 B2 | 12/2012 | Eaton et al. |
| 8,402,669 B2 | 3/2013 | Ferrari et al. |
| 8,595,948 B2 | 12/2013 | Raab et al. |
| 8,699,007 B2 | 4/2014 | Becker et al. |
| 8,719,474 B2 | 5/2014 | Ossig et al. |
| 8,931,182 B2 | 1/2015 | Raab et al. |
| 8,997,362 B2 | 4/2015 | Briggs et al. |
| 9,234,773 B2 | 1/2016 | Cramer |
| 9,410,787 B2 | 8/2016 | Raab et al. |
| 9,423,282 B2 | 8/2016 | Moy |
| 9,513,100 B2 | 12/2016 | Raab et al. |
| 9,803,973 B1 | 10/2017 | Sajedi |
| 10,215,548 B2 | 2/2019 | Sajedi |
| 10,228,228 B2 | 3/2019 | Sajedi |
| 2003/0167647 A1 | 9/2003 | Raab et al. |
| 2011/0173825 A1* | 7/2011 | Danielson ............ G01B 11/007 33/503 |
| 2015/0219452 A1* | 8/2015 | Bridges ................. G01B 5/008 33/503 |
| 2016/0084633 A1* | 3/2016 | Ferrari .................. G01B 21/04 33/503 |
| 2018/0216923 A1* | 8/2018 | Creachbaum .......... G01B 5/012 |
| 2019/0249974 A1* | 8/2019 | Sajedi ................. G05B 19/404 |

* cited by examiner

ULTRA-LIGHT AND ULTRA-ACCURATE PORTABLE COORDINATE MEASUREMENT MACHINE WITH UNIQUE BASE PLATE ARRANGEMENT

BACKGROUND

The present disclosure relates generally to a coordinate measuring machine and more particularly to a high accuracy, ultra-lightweight portable coordinate measuring machine.

Coordinate measurement machines serve to, among other things, measure points in a three-dimensional space. Coordinate measuring machines trace the measuring points in Cartesian coordinate space (x, y, z), for example. Coordinate measuring machines typically consist of a stand and a tracing system. The stand may serve as a reference point relative to which the tracing system moves in the space in a measurable manner. The tracing system for a portable coordinate measuring machine may include an articulated arm attached to the stand at one end and a measurement probe at the other end.

For the measurement to be useful, it must be accurate. Very high accuracy, however, is difficult to achieve because of factors such as temperature and load conditions. Particularly in portable coordinate measuring machines, warping of the arm caused by thermal changes or by changes in loads has a negative effect on the measurement's accuracy. Consequently, in terms of their performance, conventional portable coordinate measuring machines were not nearly as accurate as conventional, non-portable type coordinate measuring machines.

Accuracy Improvements may be available. Conventionally, however, such improvements came accompanied by significant increases in mass and/or weight of the coordinate measuring machine. Conventional portable coordinate measuring machines of improved accuracy were bulky and heavy. These are undesirable characteristics for coordinate measuring machines, particularly portable coordinate measuring machines. Moreover, processes for constructing and assembling coordinate measuring machines' joints, particularly long joints, with the required precision to obtain accurate measurements have not been available.

SUMMARY OF THE INVENTION

The present disclosure provides a portable coordinate measurement machine (CMM) that is more accurate than prior art coordinate measuring machines. Remarkably, the CMM disclosed herein is also lighter and less bulky.

In an aspect of the invention, the CMM disclosed herein includes a novel base plate for mounting the CMM. The base plate has a cavity with a bottom opening. The main printed circuit board of the CMM may be disposed horizontally within the cavity. When compared with prior CMM mounting main printed circuit board housing arrangements, the base plate design disclosed herein is simpler (one piece versus multiple pieces), lighter (easier to transport), less bulky, and aesthetically superior. This design is also space-efficient and minimizes the distance between the base plate and the adjacent joint, which may reduce flexing or deformation of the CMM and, thus, improve the CMM's accuracy.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1A:
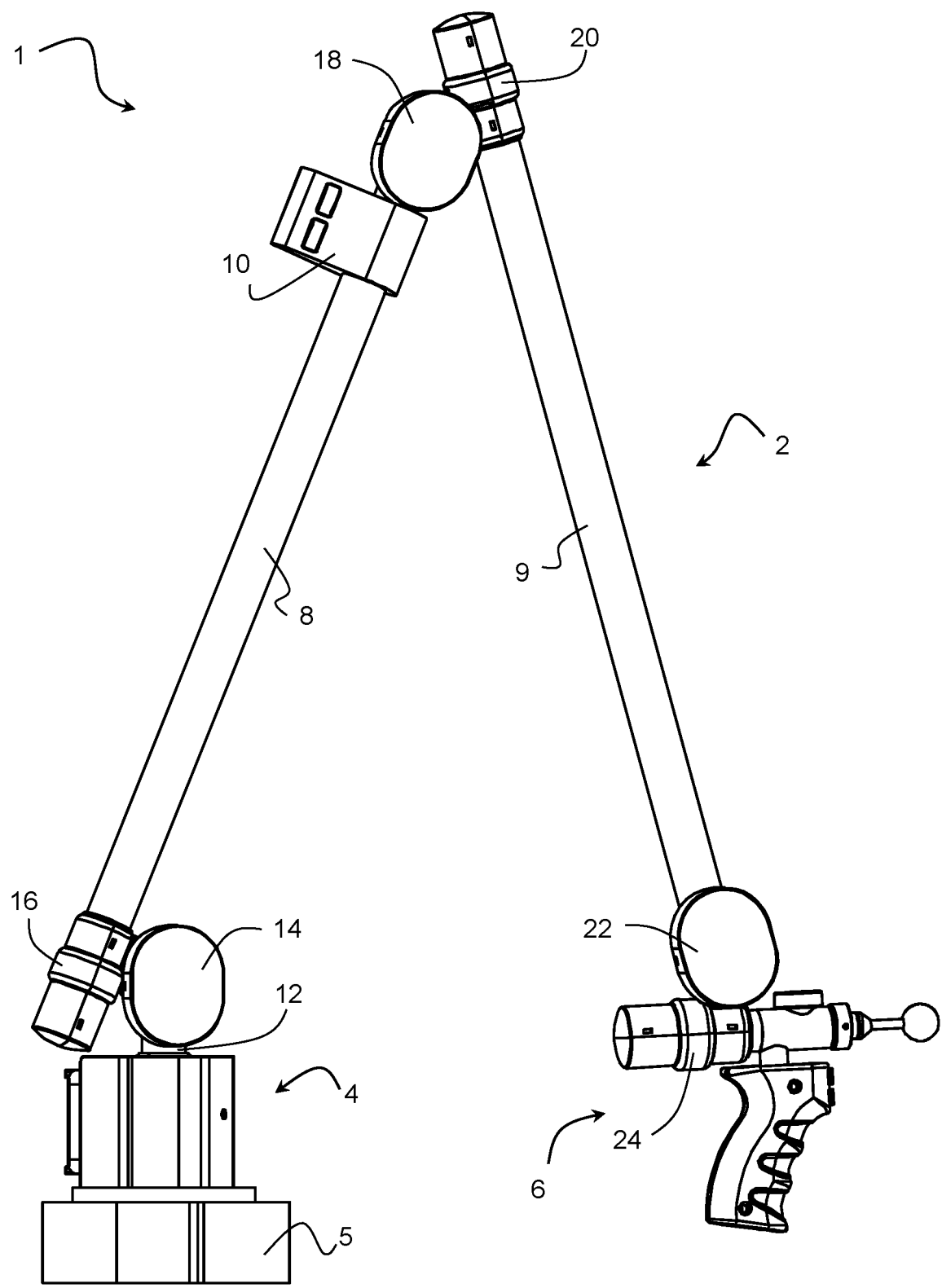
FIGS. 1A-1C illustrate perspective views of an exemplary coordinate measuring machine (CMM).
Figure 1B:
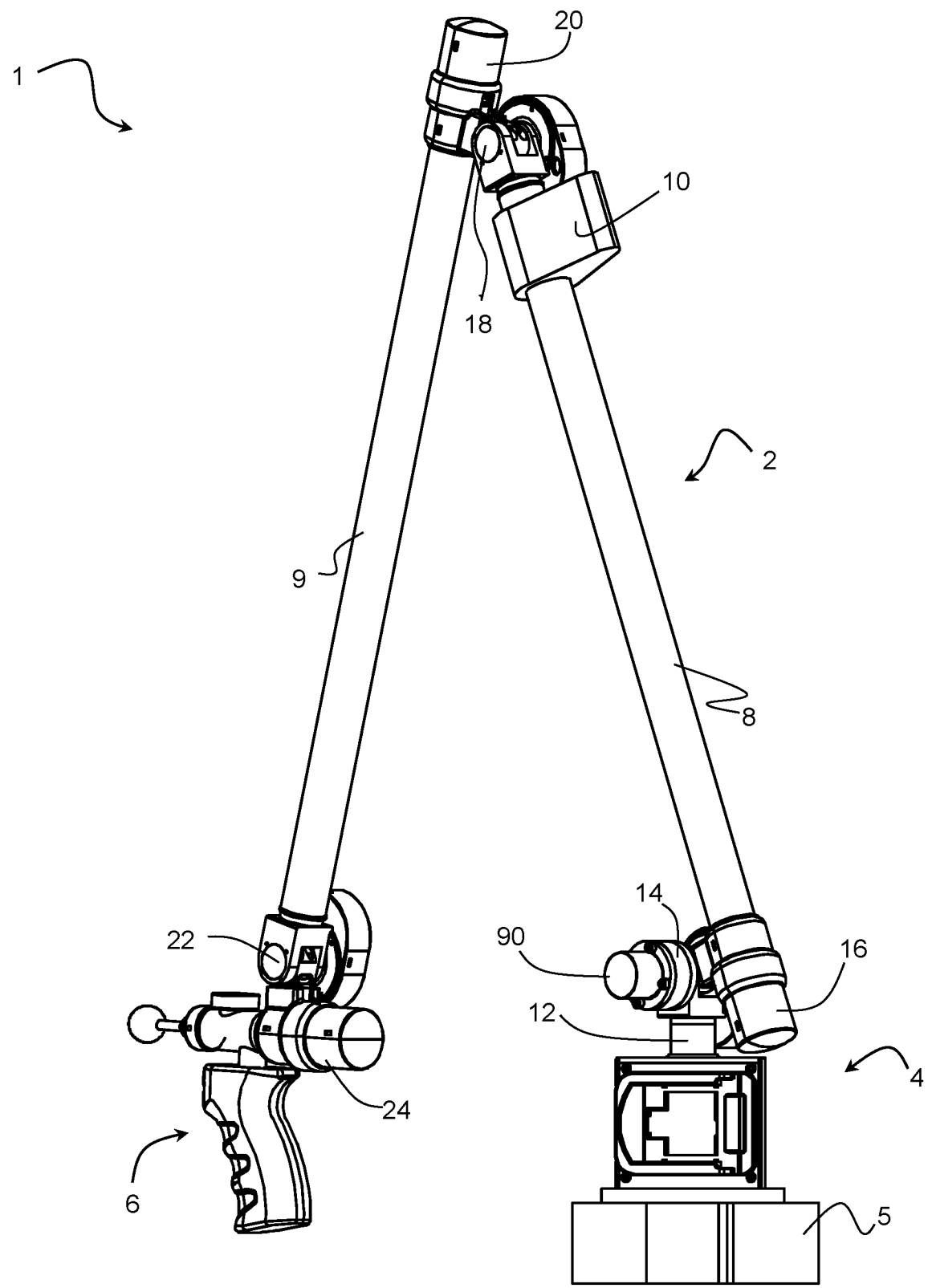
Figure 1C:
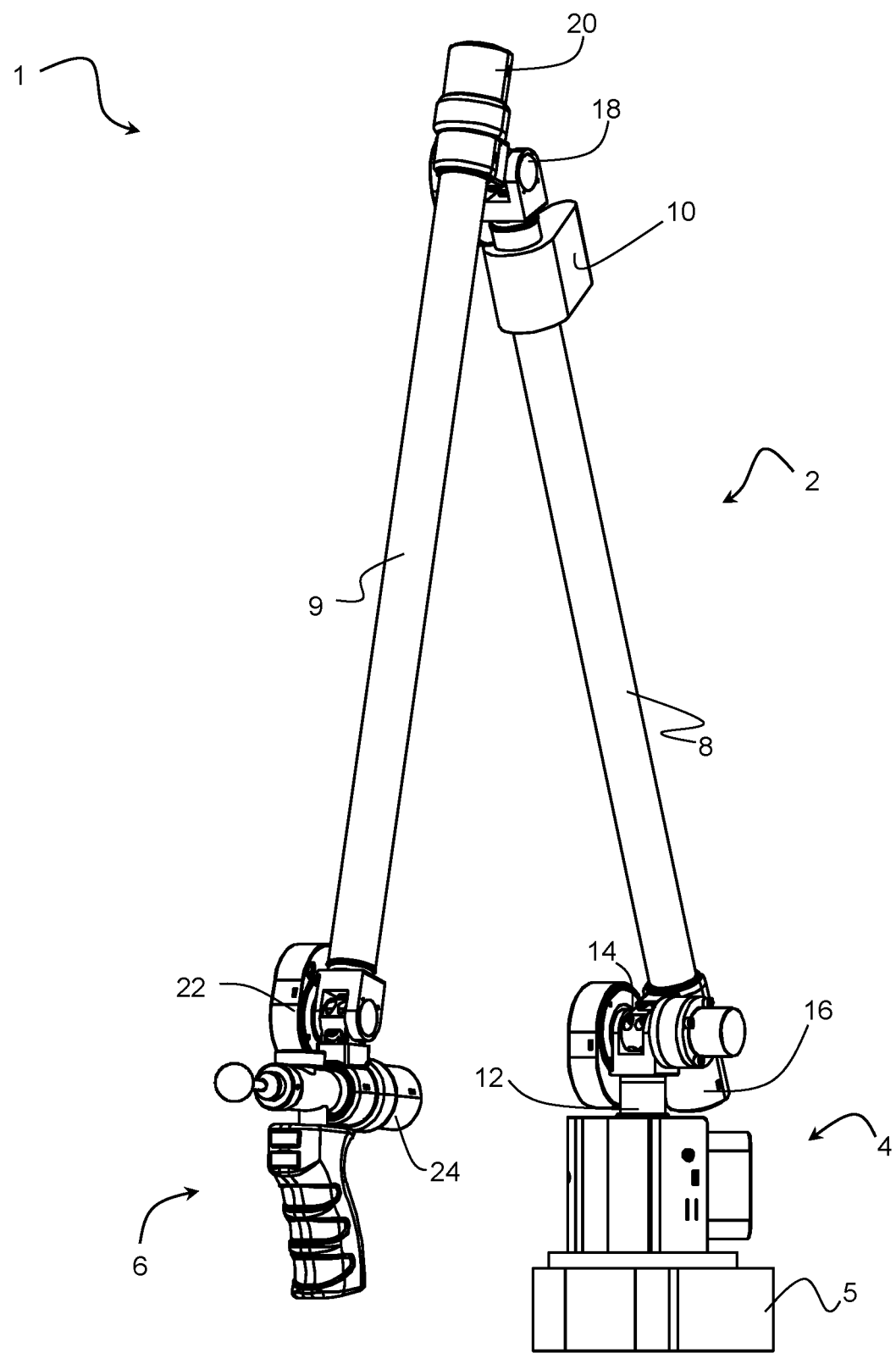
Figure 1D:
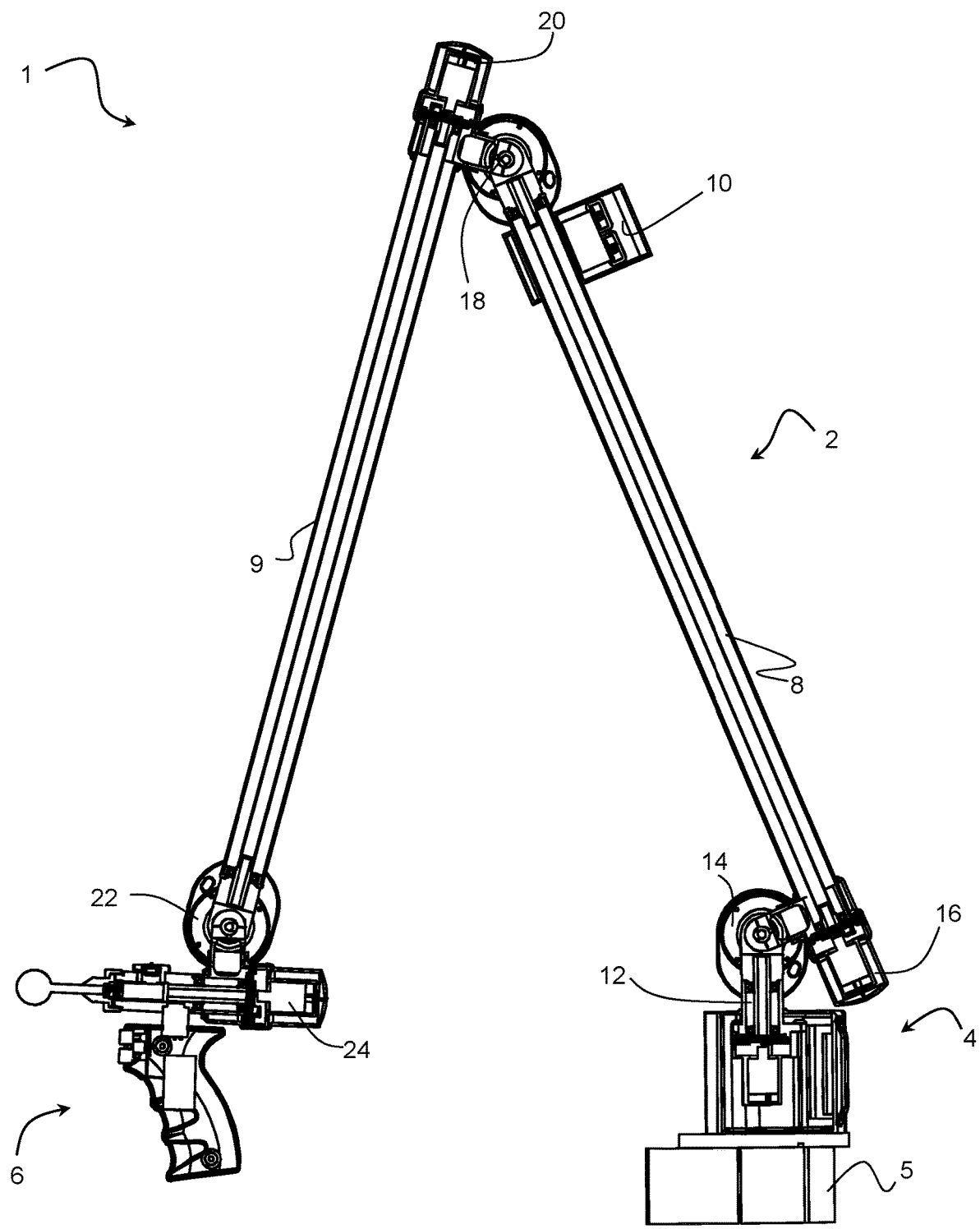
FIG. 1D illustrates a cross-sectional view of the exemplary CMM of FIGS. 1A-1C.

FIGS. 1A-1C illustrate perspective views of an exemplary coordinate measuring machine (CMM) 1. FIG. 1D illustrates a cross-sectional view of the exemplary CMM 1. CMM 1 includes an articulated arm 2, a base 4, and a measurement probe 6. The articulated arm 2 is attached at one end to the base 4 and at the other end to the measurement probe 6. The base 4 may be attached to, for example, a magnetic holder 5 to attach the arm 2 to, for example, a working surface. Articulated arm 2 includes two arm segments 8, 9 and a number of rotary joints 12, 14, 16, 18, 20, 22, 24. The CMM 1 may also include an on-arm switch assembly 10.

The overall length of articulated arm 2 and/or the arm segments 8, 9 may vary depending on its intended application. In one embodiment, the articulated arm may have an overall length of about 48 inches. This arm dimension provides a portable CMM which is well suited for measurements now accomplished using typical hand tools such as micrometers, height gages, calipers and the like. Articulated arm 2 could have smaller or larger dimensions.

The rotary joints generally include two types of joints, swivel joints 12, 16, 20, 24 and hinge joints 14, 18, 22. The swivel joints 12, 16, 20, 24 are positioned generally axially or longitudinally along the arm 2. The hinge joints 14, 18, 22 are positioned generally at 90° to the swivel joints or 90° to the longitudinal axis of the arm 2. The swivel and hinge joints are generally paired up as shown in FIGS. 1A-1 D but the joints may be arranged in other configurations. Because of the multiple rotary joints, the arm 2 is manually-positionable meaning that a user is free to manually move the probe 6 to virtually any position within a radius anchored at the base 4 of the CMM 1. Each of these joints are generally shown in FIGS. 2-6A.

In general, the magnetic holder 5 of the base 4 attaches the CMM 1 to a working surface, the base 4 attaches to the swivel joint 12, which attaches to the hinge joint 14, which attaches to the swivel joint 16, which attaches to the hinge joint 18, which attaches to the swivel joint 20, which attaches to the hinge joint 22, which attaches to the swivel joint 24, which attaches to the measurement probe 6.

Figure 2A:
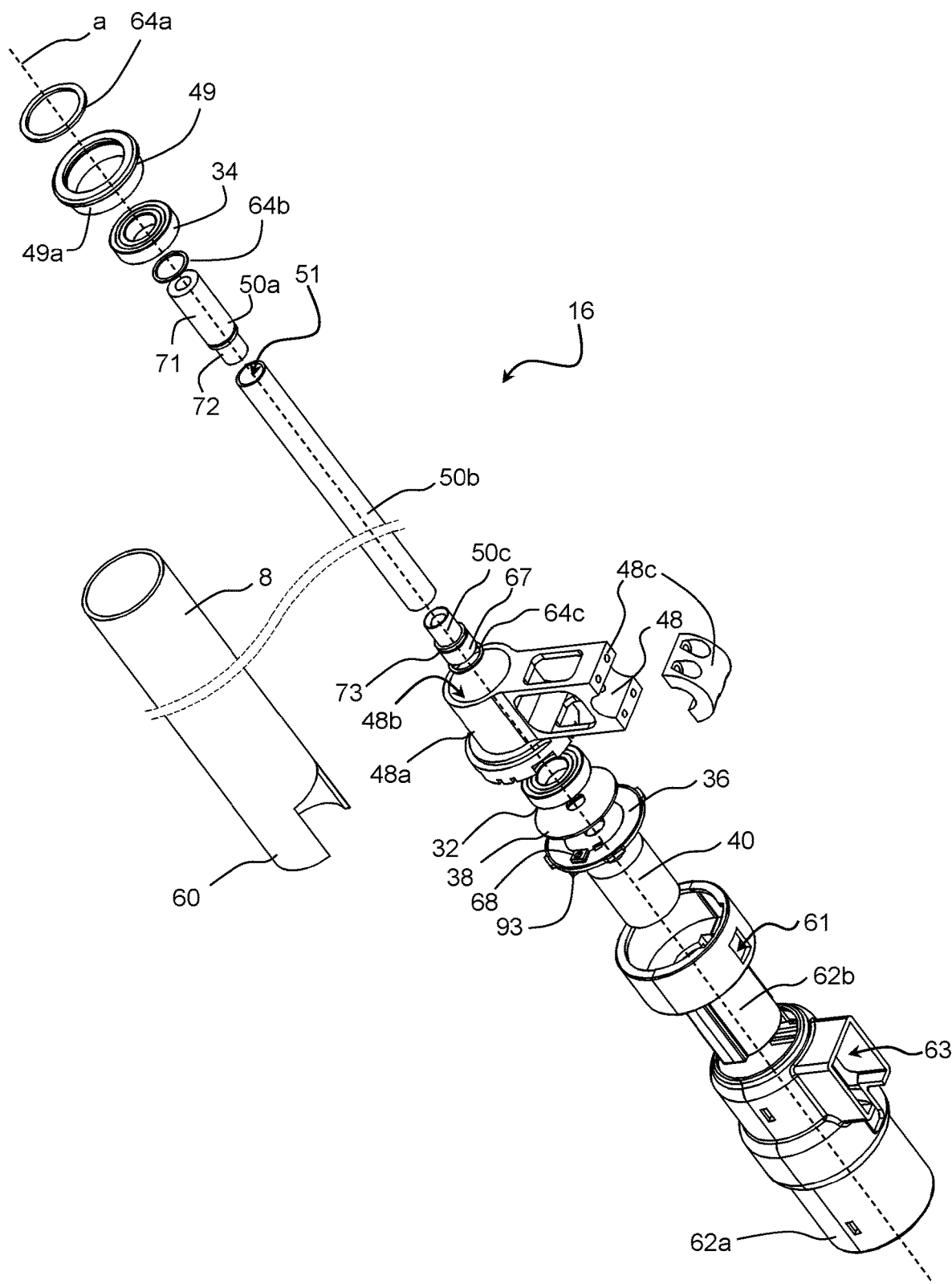
FIG. 2A and 2B illustrate partial exploded and cross-sectional views, respectively, of an exemplary swivel joint of the CMM of FIGS. 1A-1D.
Figure 2B:
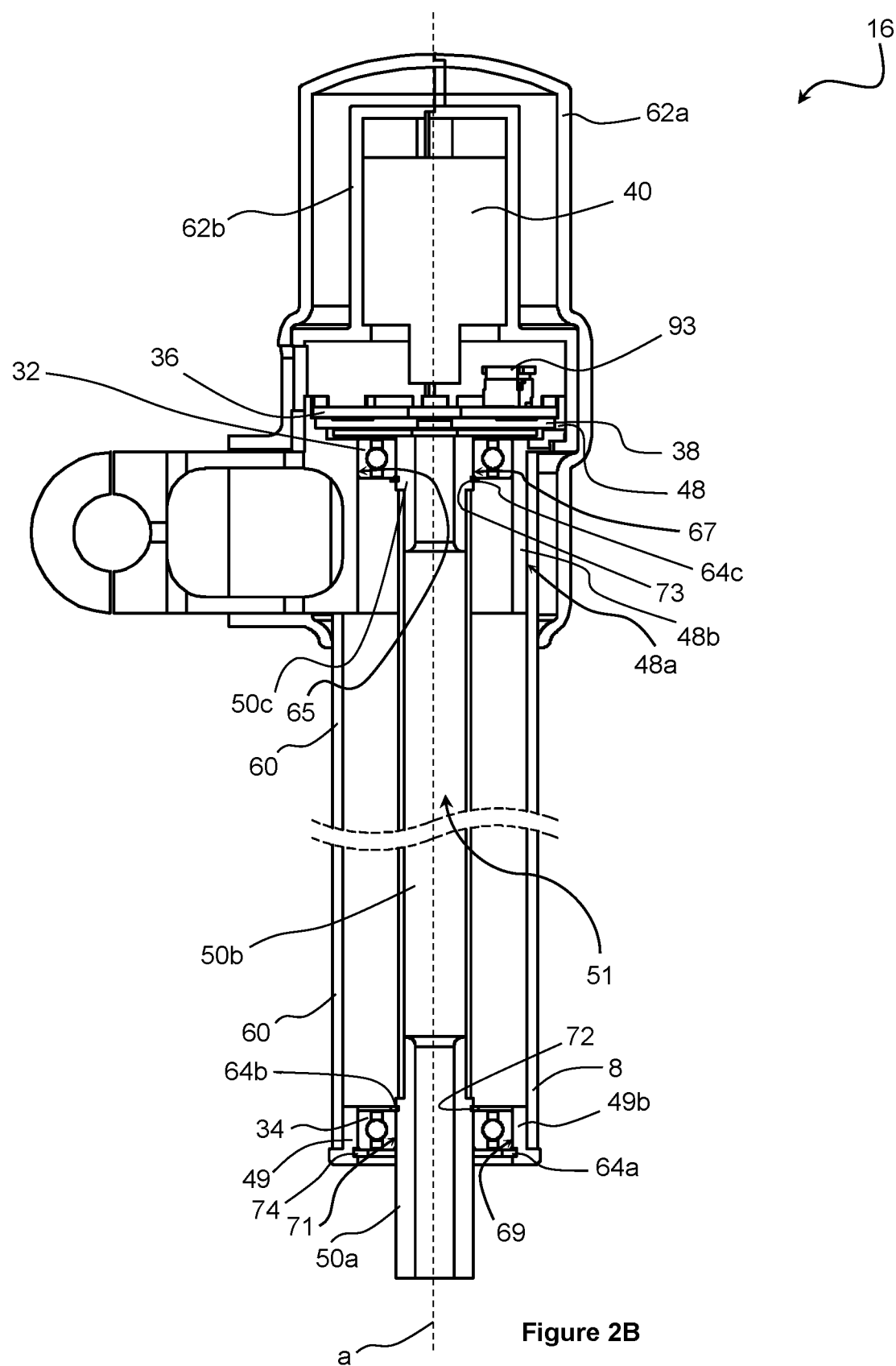

FIG. 2A illustrates partial exploded views of exemplary swivel joint 16 while FIG. 2B illustrates partial cross-sectional views of swivel joint 16. Each of the figures illustrates only the ends of the swivel joint 16; the middle portion of the swivel joint not illustrated corresponds to the arm segment 8. The swivel joint 16 will be used here to describe swivel joints 12, 16, 20, 24 in general even though the swivel joints may not be identical. The swivel joints 16 and 20 are very similar. Swivel joint 24 is also similar to swivel joints 16 and 20 except that swivel joint 24 has a shorter shaft.

The swivel joint 16 may include housings 48, 49, shaft portions 50a, 50b, and 50c, bearings 32, 34, encoder PCB 36, encoder disk 38, and slip ring 40. The bearings 32, 34 are preferably steel or stainless steel ball bearings. The shaft portions 50a and 50c may be operably attached to the ends of the shaft portion 50b to form a shaft assembly 50. The shaft portion 50b, being relatively long, may be fabricated of rigid yet relatively lighter material such as, for example, carbon fiber, aluminum, etc. as well as from steel. The shaft portions 50a and 50c, however, may be fabricated of steel to match the material from which the bearings 32, 34 are fabricated. Similar to the relatively long shaft portion 50b, the tube 60 within which the shaft portion 50b resides may be fabricated of the same rigid yet relatively light material as shaft portion 50b as well as from steel. The swivel joint 16 may also include covers 62a-b and various hardware such as the snap rings 64a-c.

At one end of the swivel joint 16, the housing 48 has a surface 48a that operably attaches to one end of the tube 60 of the corresponding arm segment (arm segment 8 in the case of swivel joint 16). The housing 48 also has a shaft connecting portion 48c that operably connects the swivel joint 16 to the previous hinge joint (see FIGS. 1A-1 D). In the case of swivel joint 16, the shaft connecting portion 48c connects the swivel joint 16 to the shaft of the hinge joint 14. At the other end of the swivel joint 16, the housing 49 has a surface 49a that operably attaches to a second end of the tube 60 of the corresponding arm segment (arm segment 8 in the case of swivel joint 16). The housing 49 also has a port 49b within which an end of the shaft assembly resides, particularly shaft portion 50a.

As may be best seen in FIG. 2B, at one end of the swivel joint 16, the inner diameter 65 of the port 48b of the housing 48 engages (e.g., fixedly attaches to) the outer diameter or outer race of the bearing 32. The port 48b of the housing 48 may, for example, be glued to the outer diameter or outer race of the bearing 32. The shaft portion 50c, for its part, has an outer diameter 67 that engages (e.g., is fixedly attached to) the inner diameter or inner race of the bearing 32. The shaft portion 50c may, for example, be glued to the inner diameter or inner race of the bearing 32. At the other end of the swivel joint 16, the inner diameter 69 of the port 49b of the housing 49 engages (e.g., fixedly attaches to) the outer diameter or outer race of the bearing 34. The port 49b of the housing 49 may, for example, be glued to the outer diameter or outer race of the bearing 34. The shaft portion 50a, for its part, has an outer diameter 71 that engages (e.g., is fixedly attached to) the inner diameter or inner race of the bearing 34. The shaft portion 50a may, for example, be glued to the inner diameter or inner race of the bearing 34. The shaft assembly 50, therefore, rotates about the axis of rotation a of the bearings 32 and 34 and the housings 48 and 49.

The PCB 36 of the swivel joint 16 has installed thereon at least one transducer configured to output an angle signal corresponding to an angle of rotation of the shaft assembly 50 relative to the housing 48, 49 about the axis of rotation a. Each transducer comprises an optical encoder that has two primary components, a read head 68 and the encoder disk 38. In one embodiment, two read heads 68 are positioned on PCB 36. In the illustrated embodiment, the encoder disk 38 is operably attached to an end of the shaft assembly 50 (e.g., using a suitable adhesive) spaced from and in alignment with read heads 68 on PCB 36, which is operably attached to the housing 48 (e.g., using a suitable adhesive). The locations of disk 38 and read heads 68 may be reversed whereby disk 38 may be operably attached to housing 48 and read heads 68 rotate with shaft assembly 50 so as to be rotatable with respect to each other while maintaining optical communication. Encoders are commercially available from, for example, Celera Motion under trade names such as MicroE encoders. Each PCB 36 may additionally include a processor for receiving angle signals from the read heads 68, and a transceiver and connector 93 for connecting the PCB 36 to the communication bus of the CMM 1 and/or other wiring. Each of the PCB 36 may also include a temperature sensor connected to the processor to provide for thermal compensation due to room temperature variation.

The cover 62b operably attaches to the housing 48 to cover and seal the PCB 36 and encoder disk 38 from dust contamination. The cover 62a operably attaches over the cover 62b and portions of the housing 48 and tube 60 for cosmetic appearance. The cover 62b has the opening 63 from which the shaft connection portion 48c of the housing 48 protrudes to operably connect the swivel joint 16 to the hinge joint 14.

Swivel joint 16 (as well as other joints in CMM 1) may have unlimited rotation, meaning that it may rotate 360° about its axis of rotation a. Thus, slip ring 40 is used and provides unlimitedly rotatable electrical connections to swivel joint 16. Shafts used herein in swivel joints such as the shaft 30 of base swivel joint 12 and the shaft assembly 50 of swivel joint 16 may be hollow (i.e., have an axial opening 51). Shafts used herein in hinge joints such as the shaft 80 of hinge joint 18 described below may also be hollow and may also include an aperture 81 (see FIG. 4B). Back to FIGS. 2A and 2B, as illustrated, the housing cover 62a has the opening 63, the cover 62b has the opening 61, and the housing 48 has the opening 48d which aligns with the aperture 81 of the shaft 80 of the hinge joint 18. Thus, communication bus wiring may enter the swivel joint 16 from the aperture 81 of hinge joint 14, through the opening 48d, through the opening 63, the opening 61 and connect to PCB 36, which connects to the slip ring 40. From the slip ring 40, wiring may travel through the axial opening 51 of the shaft 50 to the next hinge joint. Such wiring is shown diagrammatically below.

The shaft portions 50a and 50c may have grooves 72, 73 machined or otherwise formed thereon. The snap rings 64b-c may engage the grooves 72, 73 to retain the shaft assembly 50 axially in place in relation to the rest of joint 16 and the bearings 32, 34. Similarly, the housing 49 may have a groove 74 machined or otherwise formed thereon. The snap ring 64a may engage the groove 74 to retain the housing 49 axially in place in relation to the rest of joint 16 and the bearings 32, 34. In one embodiment, instead of or in addition to the combination of the grooves 72, 73 and the snap rings 64b-c to retain the shaft 50 axially in place in relation to the rest of joint 16 and the bearings 32, 34, the shaft 50 may be fixedly attached to the inner diameters or inner races of the bearings 32, 34 by use of an adhesive. Similarly, in one embodiment, instead of or in addition to the combination of the groove 74 and the snap ring 64a to retain the housing 49 axially in place in relation to the rest of joint 16 and the bearings 32, 34, the surface 71 of the housing 49 may be fixedly attached to the outer diameter or outer race of the bearing 34 by use of an adhesive.

Shoulderless shafts and housings such as those illustrated in FIGS. 2A and 2B may be manufactured by grinding and honing processes that may be an order of magnitude more precise than machining process used to manufacture the shouldered or flanged shafts and housings of the prior art. The shoulderless shafts and housings disclosed herein may thus be significantly more precisely built resulting in significant improvements in the precision of measurements that may be achieved at the joint 16 and similar joints of the CMM 1. In part because of the shoulderless shafts and housings disclosed herein, the CMM 1 achieves significantly better accuracy than prior art portable coordinate measurement machines.

The swivel joint 16 of arm segment 8 is a relatively long joint as compared to, for example, joint 14 as may be appreciated from FIGS. 1A-1D. The bearings 32 and 34 are located far apart. The shaft 50 has three parts, the middle portion 50b having end portions 50a and 50c attached to the ends of the middle portion 50b far apart from each other. The outer tube 60 is long with housing ends 48 and 49 spaced far apart from each other.

Figure 3:
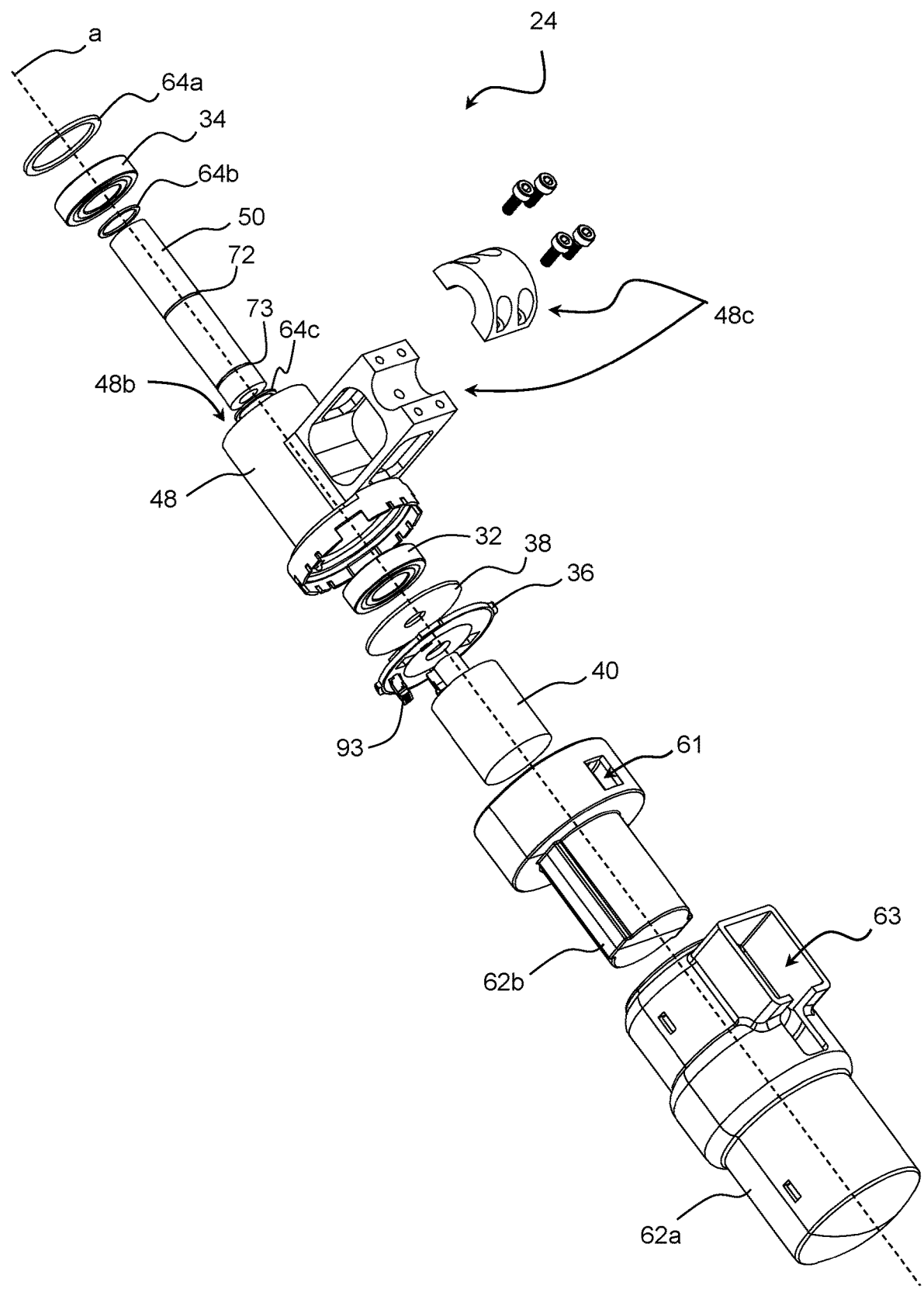
FIG. 3 illustrates an exploded view of an exemplary swivel joint of the CMM of FIGS. 1A-1D.

FIG. 3 illustrates an exploded view of an exemplary swivel joint 24. Swivel joint 24 is similar to swivel joints 16 and 20 described above except that swivel joint 24 has a shorter shaft 50 whose length corresponds to the distance between swivel joint 24 and probe 6 being shorter than the distance between, for example, swivel joint 16 and hinge joint 18. Thus, the probe 6 rotates about the axis a of the swivel joint 24 and the swivel joint 24 detects the angle of rotation of the probe 6, which is attached to the end of the swivel joint 16. See FIGS. 1A-1D.

Figure 4A:
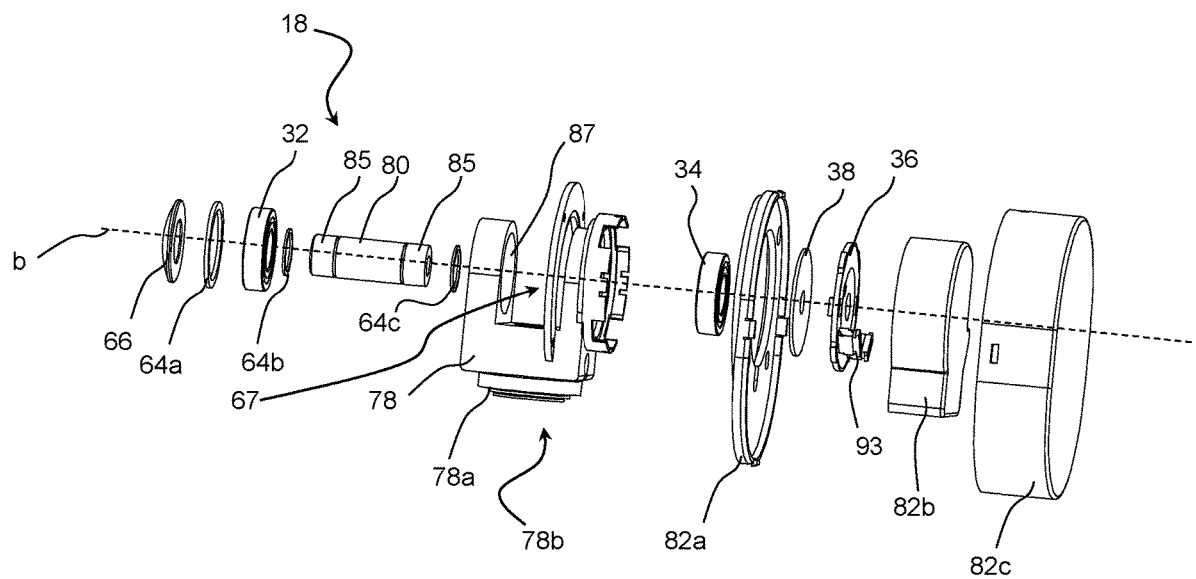
FIG. 4A and 4B illustrate exploded and cross-sectional views, respectively, of a hinge joint of the CMM of FIGS. 1A-1D.
Figure 4B:
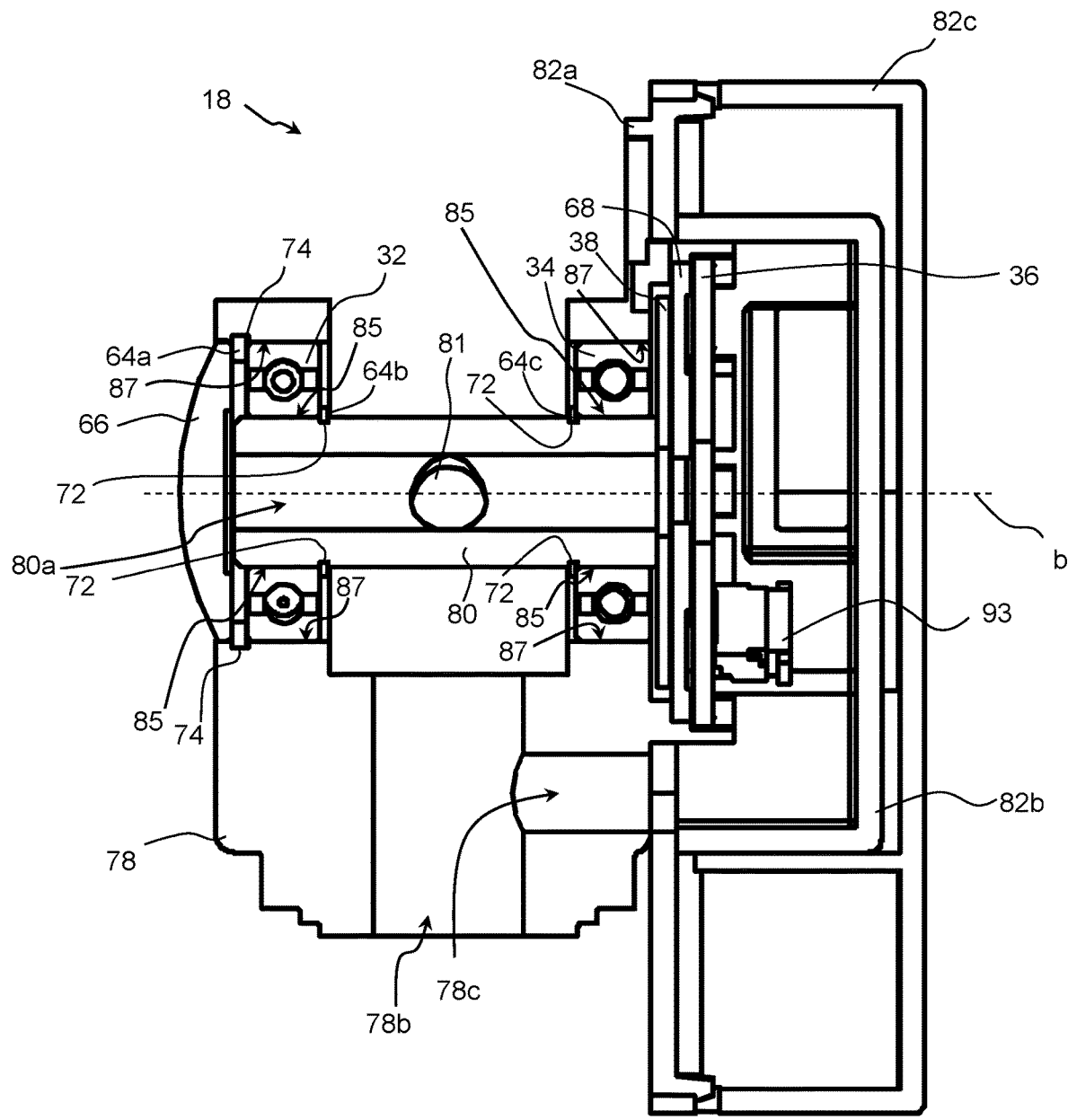

FIG. 4A illustrates an exploded view of exemplary hinge joint 18 while FIG. 4B illustrates a cross-sectional view of hinge joint 18. The hinge joint 18 will be used here to describe hinge joints 14, 18, 22 in general even though the hinge joints may not be identical. At least some of the components of hinge joint 18 are substantially similar to components discussed in detail above in reference to swivel joints 12 and 16 and thus these similar components are identified in FIGS. 4A and 4B with the same reference designators as in the previous figures.

The hinge joint 18 may include housing 78, shaft 80, bearings 32, 34, encoder PCB 36, and encoder disk 38. The housing 78 has an opening 78b to which the shaft of the previous swivel joint (shaft 50 of swivel joint 16 in the case of hinge joint 18) connects. The hinge joint 18 may also include covers 82a-c and various hardware such as the snap rings 64a-c and cap 66.

As may be best seen in FIG. 4B, the housing 78 has ports 87 that engage (e.g., fixedly attach to) the outer diameters or outer races of the bearings 32, 34. The ports 87 of the housing 78 may, for example, be glued to the outer diameter or outer race of the bearings 32 and 34. In the embodiment of FIGS. 4A and 4B the housing 78 has two ports 87. The shaft 80, for its part, has an outer diameter 85 that engages (e.g., is fixedly attached to) the inner diameter or inner race of the bearings 32, 34. The shaft 80 may, for example, be glued to the inner diameter or inner race of the bearings 32, 34. The shaft 80, therefore, rotates about the axis of rotation b of the bearings 32 34 and the housing 78 of the hinge joint 18.

Similar to the swivel joints discussed above, the PCB 36 of the hinge joint 18 has installed thereon at least one transducer configured to output an angle signal corresponding to an angle of rotation of the shaft 80 relative to the housing 78 about the axis of rotation b. Each transducer comprises an optical encoder that has two primary components, a read head 68 and the encoder disk 38. In the illustrated embodiment, two read heads 68 are positioned on PCB 36. In the illustrated embodiment, the encoder disk 38 is operably attached to an end of the shaft 80 (e.g., using a suitable adhesive) spaced from and in alignment with read heads 68 on PCB 36, which is operably attached to the housing 78 (e.g., using a suitable adhesive). The locations of disk 38 and read heads 68 may be reversed whereby disk 38 may be operably attached to housing 78 and read heads 68 rotate with shaft 80 so as to be rotatable with respect to each other while maintaining optical communication.

The cover 82b operably attaches to the housing 78 to cover and seal the PCB 36 and encoder disk 38 from dust. The covers 82a and 82c operably attach to each other at one end of the shaft 80 and the cap 66 caps to the opposite end of the shaft 80 to protect the bearings.

Communications bus wiring may enter the hinge joint 18 from the axial opening 51 of the shaft 50 of the previous swivel joint through the openings 78b, 78c of the housing 78. The wiring may then connect to the PCB 36 and depart the hinge joint 18 through the axial opening 80a and the aperture 81 of shaft 80. Such wiring is shown diagrammatically below.

The shaft 80 may have grooves 72 machined or otherwise formed thereon. The snap rings 64b-c may engage the grooves 72 to retain the shaft 80 axially in place in relation to the rest of joint 18 and the bearings 32, 34. Similarly, the housing 78 may have a groove 74 machined or otherwise formed thereon. The snap ring 64a may engage the groove 74 to retain the housing 78 axially in place in relation to the rest of joint 18 and the bearings 32, 34. In one embodiment, instead of or in addition to the combination of the grooves 72 and the snap rings 64b-c to retain the shaft 80 axially in place in relation to the rest of joint 18 and the bearings 32, 34, the shaft 80 may be fixedly attached to the inner diameters or inner races of the bearings 32, 34 by use of an adhesive. Similarly, in one embodiment, instead of or in addition to the combination of the groove 74 and the snap ring 64a to retain the housing 78 axially in place in relation to the rest of joint 18 and the bearings 32, 34, the ports 87 of the housing 78 may be fixedly attached to the outer diameters or outer races of the bearings 32, 34 by use of an adhesive.

Shoulderless shafts and housings such as those illustrated in FIGS. 5A and 5B may be manufactured by grinding and honing processes that may be an order of magnitude more precise than machining process used to manufacture the shouldered or flanged shafts and housings of the prior art. The shoulderless shafts and housings disclosed herein may thus be significantly more precisely built resulting in significant improvements in the precision of measurements that may be achieved at the joint 18 and similar joints of the CMM 1. In part because of the shoulderless shafts and housings disclosed herein, the CMM 1 achieves significantly better accuracy than prior art portable coordinate measurement machines.

In one embodiment, structural elements of the joints of the arm 2 may be fabricated of steel matching the material from which the bearings 32, 34 are fabricated. Structural elements in this context refer to housings 28, 48, 49, and 78, shafts 30, 50, and 80, and shaft portions 50*a* and 50*c*. These are the structural elements that are in contact with the inner or outer race of the ball bearings 32, 34. The housing 48 also attaches a swivel joint to the next hinge joint. Steel in this context includes stainless steel and has a thermal expansion coefficient in the range of between of 9.9 to 18 μm/m° C. at 25° C. The use of relatively heavy steel for the structural elements of the joints of the arm 2 may seem somewhat counterintuitive because one of the important features of the CMM 1 is that it must be lightweight. Steel is significantly heavier that the materials used by prior art coordinate measurement machines such as aluminum. Structural elements matching the material (i.e., steel) from which the bearings 32, 34 are fabricated, however, would have the same (or nearly the same) thermal expansion coefficient (i.e., would expand or contract with temperature at the same rate) as the bearings 32, 34. This minimizes variation in the joint's rigidity over temperature and thus maintains accuracy of measurements taken over the operating temperature range of the CMM 1.

In another embodiment, structural elements of the joints of the arm 2, other structural elements such as shaft portion 50*b*, tubes 60, etc. and even non-structural elements of the CMM 1 may be fabricated of a controlled expansion alloy lighter in weight than steel but having a thermal expansion coefficient matching that of chrome steel or 440 C stainless steel (i.e., in the range of between of 9.9 to 18 μm/m° C. at 25° C.). A commercially available example of such controlled expansion alloy is Osprey CE sold by Sandvik AB of Sandviken, Sweden. Structural elements fabricated from materials matching the thermal expansion coefficient (i.e., would expand or contract with temperature at the same rate) of the bearings 32, 34 minimize variation in the joint's rigidity over temperature and thus maintain accuracy of measurements taken over the operating temperature range of the CMM 1. The significantly thinner arm segments 8 and 9 fabricated from rigid yet relatively light material such as, for example, carbon fiber or controlled expansion alloy combined with structural elements (and even non-structural elements) fabricated from controlled expansion alloy result in a CMM 1 that is significantly lighter and significantly more accurate over the operating temperature range than prior art coordinate measuring machines.

Figure 5:
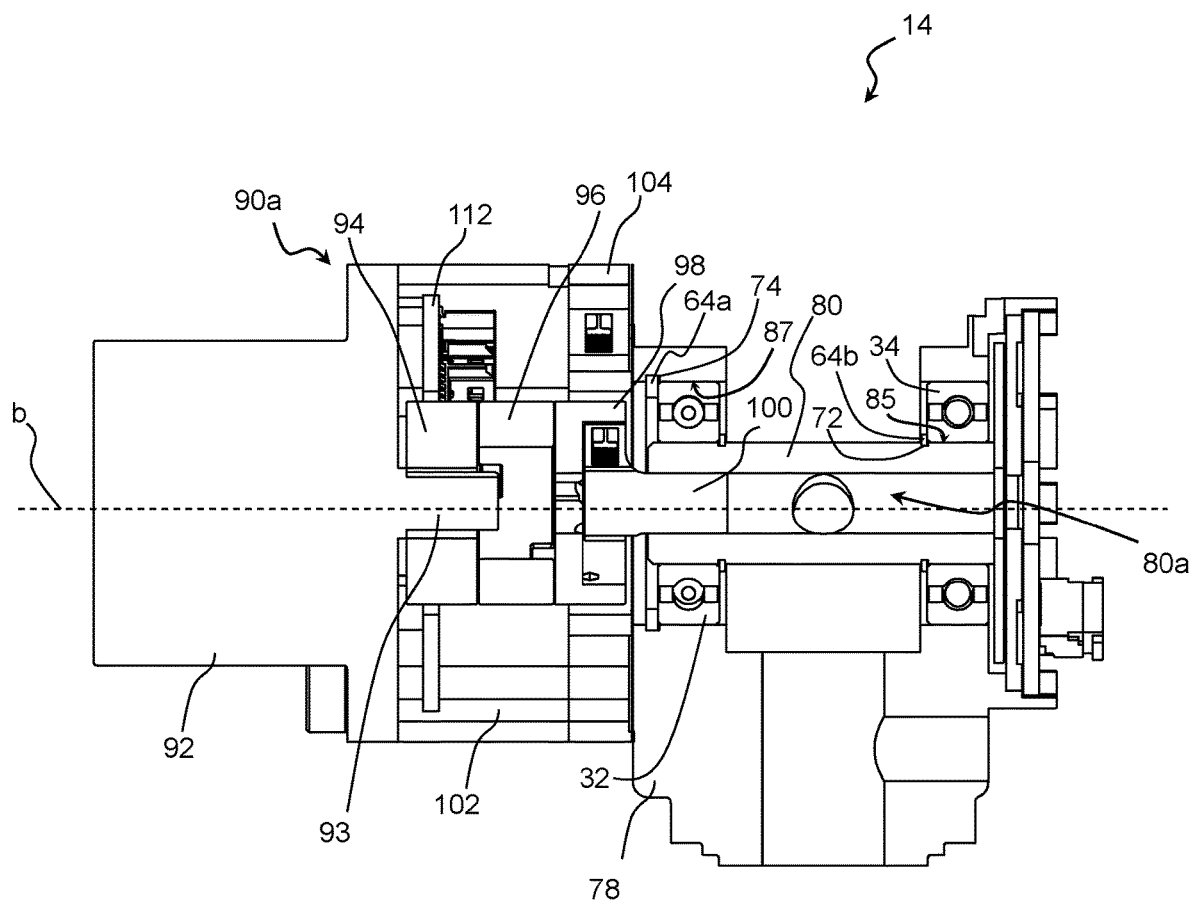
FIG. 5 illustrates a cross-sectional view of an exemplary hinge joint of the CMM of FIGS. 1A-1D including a rotary damper.

FIG. 5 illustrates a cross-sectional view of exemplary hinge joint 14. Hinge joint 22 is very similar to hinge joint 18 described above. Hinge joint 14 is also similar to hinge joints 18 and 22, a significant difference being that the hinge joint 14 includes a rotary damper assembly. In the illustrated embodiment of FIG. 5, the rotary damper assembly is an instrumented assembly 90*a* as described in detail below. To ease the use of the arm 2, a counter balance arrangement in the form of the rotary damper assembly 90*a* may be provided to offset the torque applied by the weight of the articulated arm. The counter balance prevents the articulated arm 2 from falling down rapidly due to its own weight if the user releases it.

The assembly 90*a* includes the rotary damper 92 which may be a commercially available rotary damper such as WRD dampers manufactured by Weforma Dampfungstechnik GmbH of Stolberg, Germany. In one embodiment, the rotary damper 92 is a unidirectional rotary damper that provides controlled damping of rotational movement of the shaft about the axis of rotation in one direction of rotation. The assembly 90*a* may also include damper hub 94, damper sleeve 96, and torque sensor shaft hub 98, which together form an Oldham coupling. The assembly 90*a* may also include torque sensor shaft 100. The assembly 90*a* may also include spacer 102, mount 104, and hardware such as bolts.

The damper assembly 90*a* comes together by first coupling a portion of the torque sensor shaft 100 to the shaft 80 of the hinge joint 14. A portion of the torque sensor shaft 100 may be inserted in and fixedly attached to (e.g., by using adhesive) the axial opening 80*a* of the shaft 80. The mount 104 is coupled to the housing 78 of the hinge joint 14 by inserting bolts and threading them into threaded openings in the housing 78. The rest of the components of the rotary damper assembly 90*a* are then stacked in order: the shaft hub 98 on the shaft 100, the damper sleeve 96 on the shaft hub 98, the damper hub 94 on the damper sleeve 96, and the damper hub 94 on the shaft 93 of the rotary damper 92. The spacer 102 is sandwiched between the rotary damper 92 and the mount 104 by threading bolts to threaded apertures of the mount 104. Thus, the rotary damper 92 is operably coupled to the shaft 80 and the housing 78.

The rotary damper 92 provides controlled damping of rotational movement of the shaft 80 about the axis of rotation b. The amount of torque output to control damping provided by the rotary damper 92 may be preadjusted and pre-calibrated to tight specifications. Thus, the rotary damper assembly 90*a* alleviates problems with adjustment and calibration of counter balance that were typical to conventional counter balance solutions for portable coordinate measuring machines such as coil springs, torsion springs, and pistons. Also, the rotary damper assembly 90*a* provides a counter balance solution that is generally more compact and lighter in weight when compared to conventional counter balance solutions such as coil springs, torsion springs, and pistons.

Figure 6:
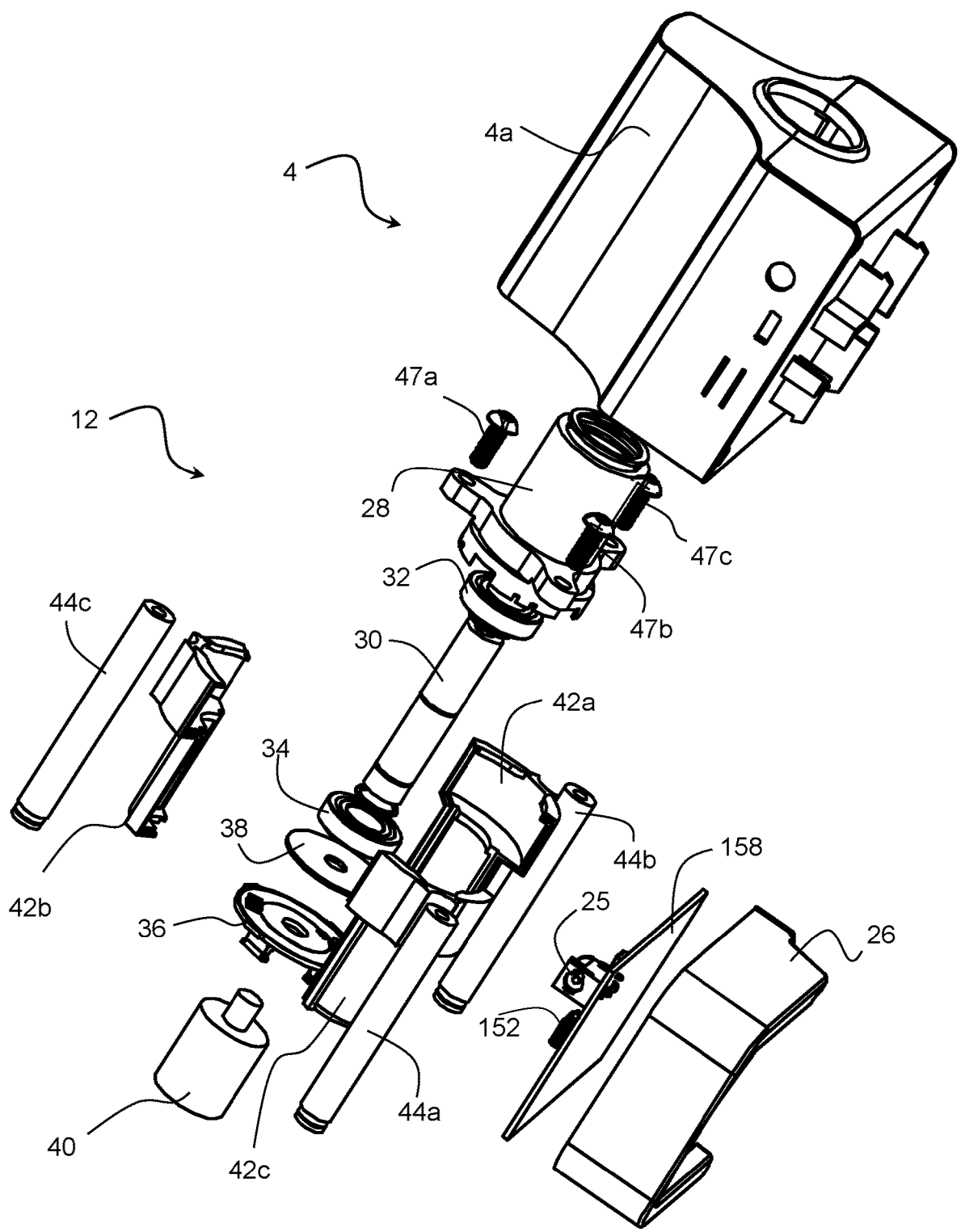
FIG. 6 illustrates an exploded view of an exemplary base and swivel joint of the CMM of FIGS. 1A-1D.

FIG. 6 illustrates an exploded view of exemplary base 4 and swivel joint 12. The base 4 may house a main printed circuit board (PCB) 158 that may receive signals from the various encoder printed circuit boards 36 of the CMM 1. The main printed circuit board 158 may also include a power jack 25 to which a power adapter may be connected to power the CMM 1 and serial communication ports (e.g., USB 152). FIG. 6 also illustrates the base enclosure 4*a*, which has mounted thereon a battery receptacle 26. The CMM 1 may be portable and, therefore, may be operated on battery power from a battery (not shown) installed to the CMM 1 via the receptacle 26.

The swivel joint 12 may include housing 28, shaft 30, bearings 32, 34, encoder printed circuit board 36, encoder disk 38, and slip ring 40. The swivel joint 12 may also include dust covers 42*a-c* and various hardware such as the threaded studs 44*a-c* and screws 47*a-c*. Swivel joints in general are discussed in detail above in reference to swivel joint 16.

Figure 7:
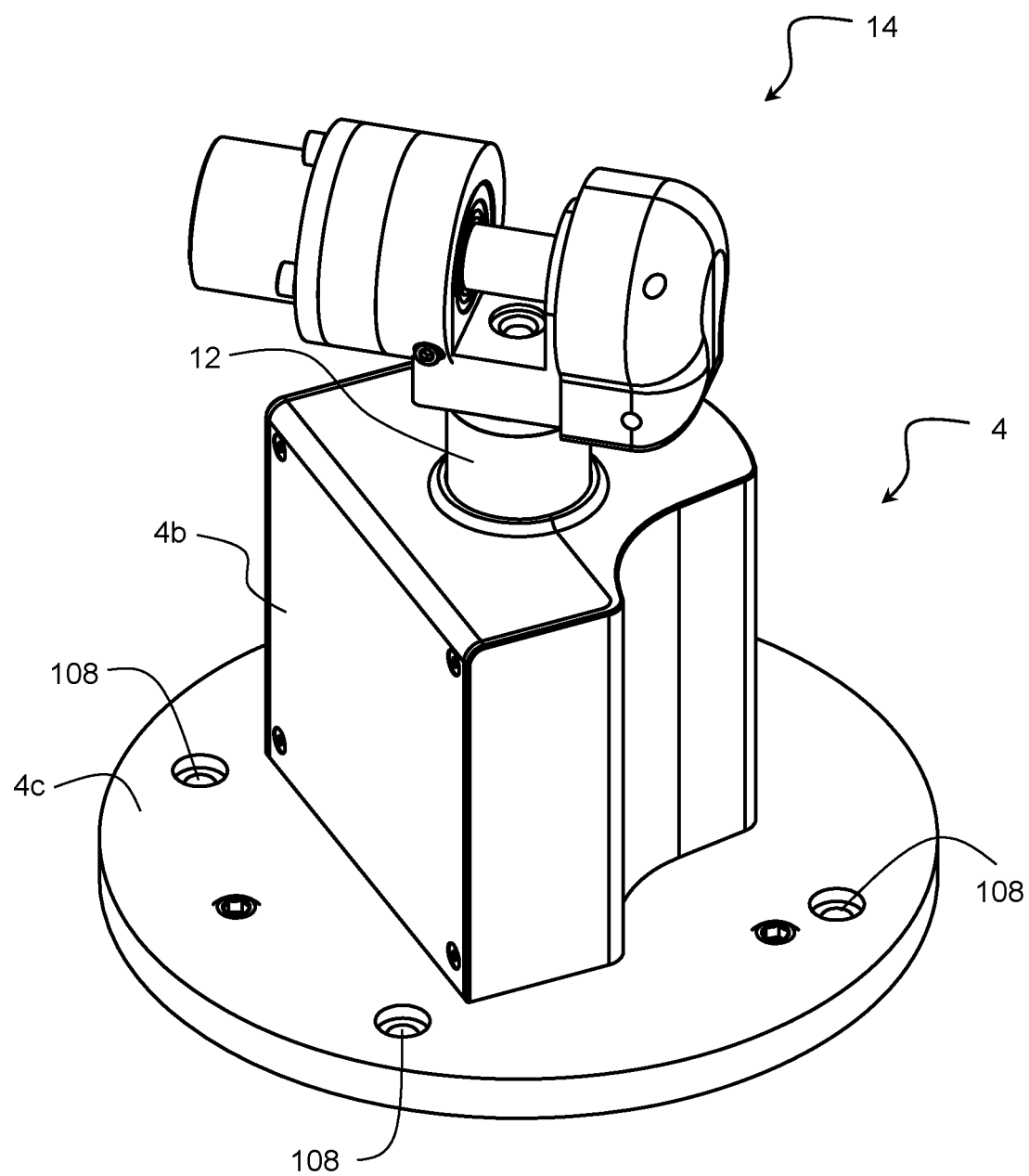
FIG. 7 illustrates a perspective view of the exemplary hinge joint of FIG. 5 mounted to the base and swivel joint of FIG. 6.

FIG. 7 illustrates a perspective view of an exemplary hinge joint 14 (as illustrated in FIG. 5) mounted to a swivel joint 12 and base 4 (as illustrated in FIG. 6). The base 4 includes multiple components such as the base enclosure 4a and the base plate 4c. The base enclosure 4a mounts to the base plate 4c which, in turn, includes mounting holes 108 for fasteners (e.g., bolts) to attach the base 4 to the magnetic holder 5 or to a mounting surface MS. The base 4 of FIG. 7 is somewhat typical of prior art CMM. It adequately allows for mounting the CMM 1 to a mounting surface MS and housing of the main printed circuit board (PCB) 158. However, this typical design is bulky, expensive, and inelegant.

Figure 8:
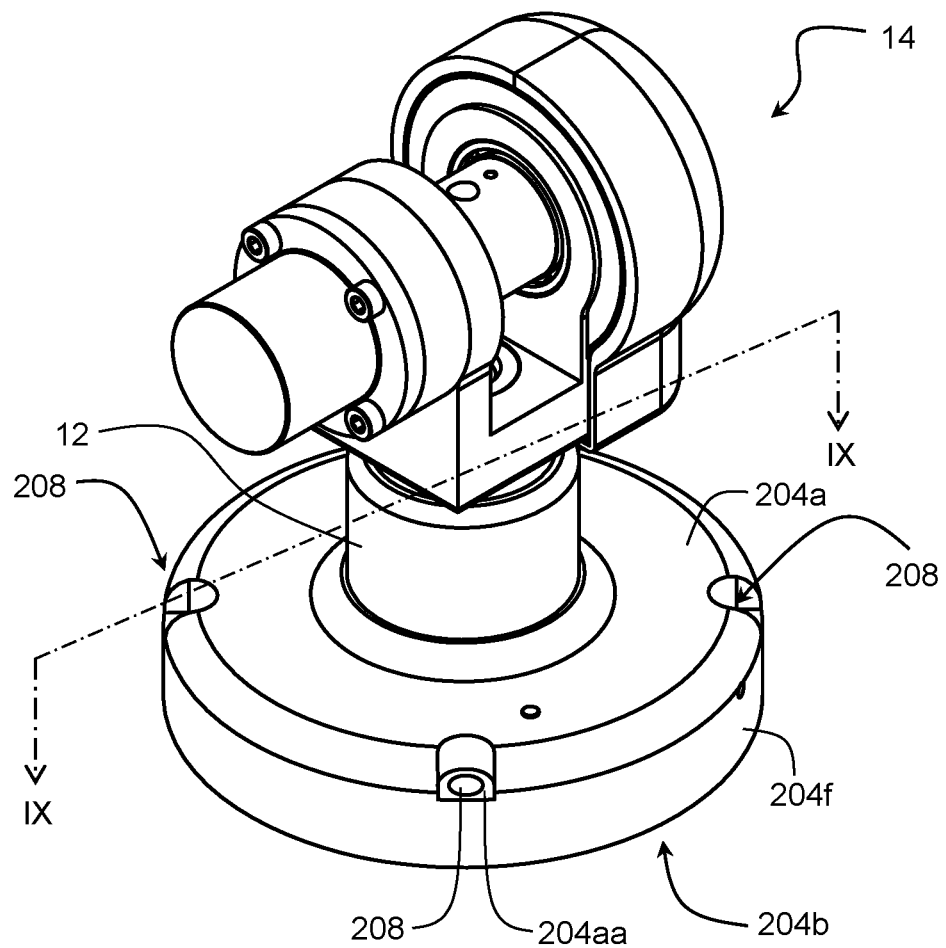
FIG. 8 illustrates a perspective view of the exemplary hinge joint of FIG. 5 mounted to a swivel joint and a novel base plate.

FIG. 8 illustrates a perspective view of an exemplary hinge joint 14 (as illustrated in FIG. 5) mounted to a swivel joint 12 and a base plate 204. Similar to the enclosure 4a of the base 4, the base plate 204 may house the main printed circuit board (PCB) 158 that includes the power jack 25, serial ports (e.g., USB 152), etc. In the illustrated embodiment of FIGS. 8 and 9, the base plate 204 is disk-shaped and the main printed circuit board 158 is disposed inside the disk. In other embodiments, the base plate 204 may not be disk-shaped but instead may be an ovoid, a rectangular prism, etc. but still have the main printed circuit board 158 disposed inside.

Similar to the plate 4c of the base 4, the base plate 204 may have mounting holes 208 formed thereon to receive fasteners (e.g., bolts) for mounting the base plate 204 to the magnetic holder 5 or to the mounting surface MS. As can be appreciated from FIGS. 8-10, however, the improved design of the base plate 204 is simpler (fewer pieces), lighter (easier to transport), less bulky, and aesthetically more pleasant. When compared to the base 4, this design also minimizes the distance between the mounting plate and the joint 12 (compare the location of joint 12 relative to the mounting surface MS between FIGS. 7 and 8), which may reduce flexing or deformation of the CMM 1 and, thus, improve the CMM's accuracy.

The mounting holes 208 may be formed to extend through a circular side wall 204g from a top surface 204a (or 204aa) to a bottom surface 204b of the base plate 204. In the embodiment of FIG. 8, the top surfaces 204aa on which the through-holes 208 are formed, are counterbored to bury fastener head below surface 204a for aesthetic purposes. Thus, the mounting holes 208 may have a top opening formed on the top surface 204a (or 204aa) and a bottom opening formed on the bottom surface 204b.

The base plate 204 may also have formed thereon side pockets or holes 204h to allow access to the power jack 25, a USB connector 152, etc.

Figure 9:
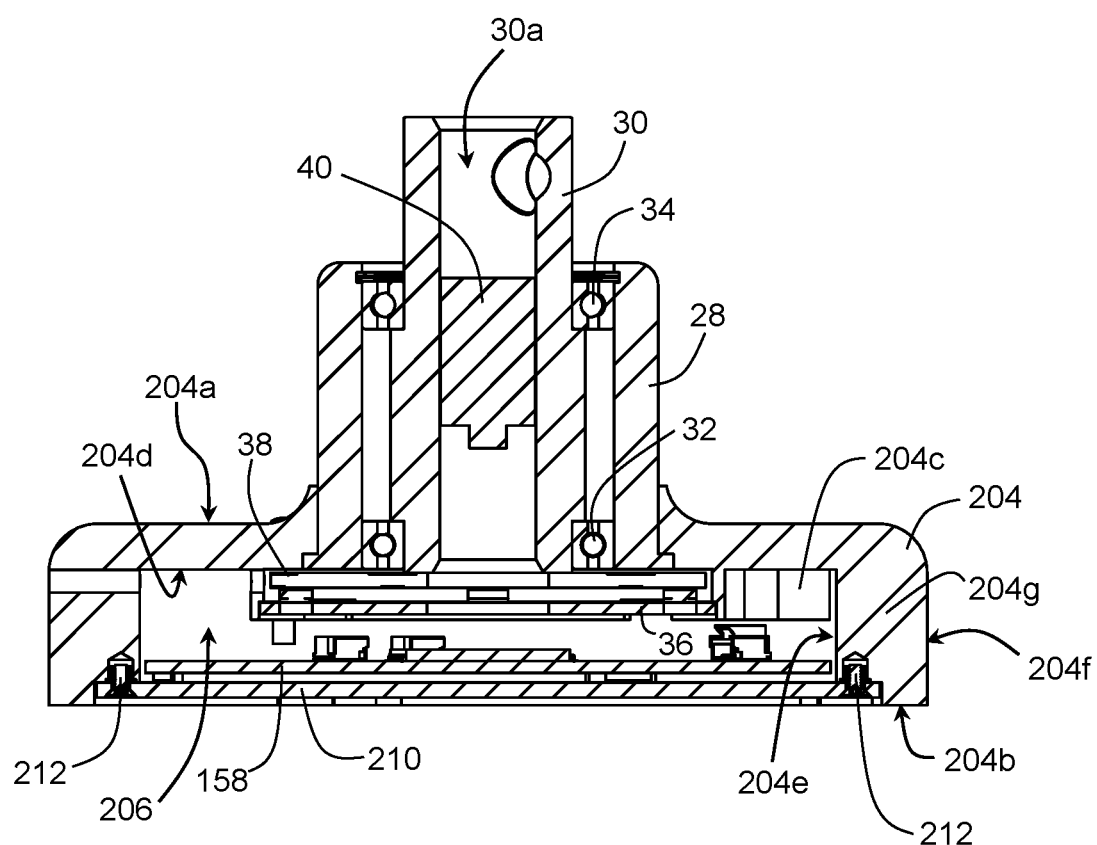
FIG. 9 illustrates a cross-sectional view of the exemplary swivel joint and base plate of FIG. 8.
Figure 10:
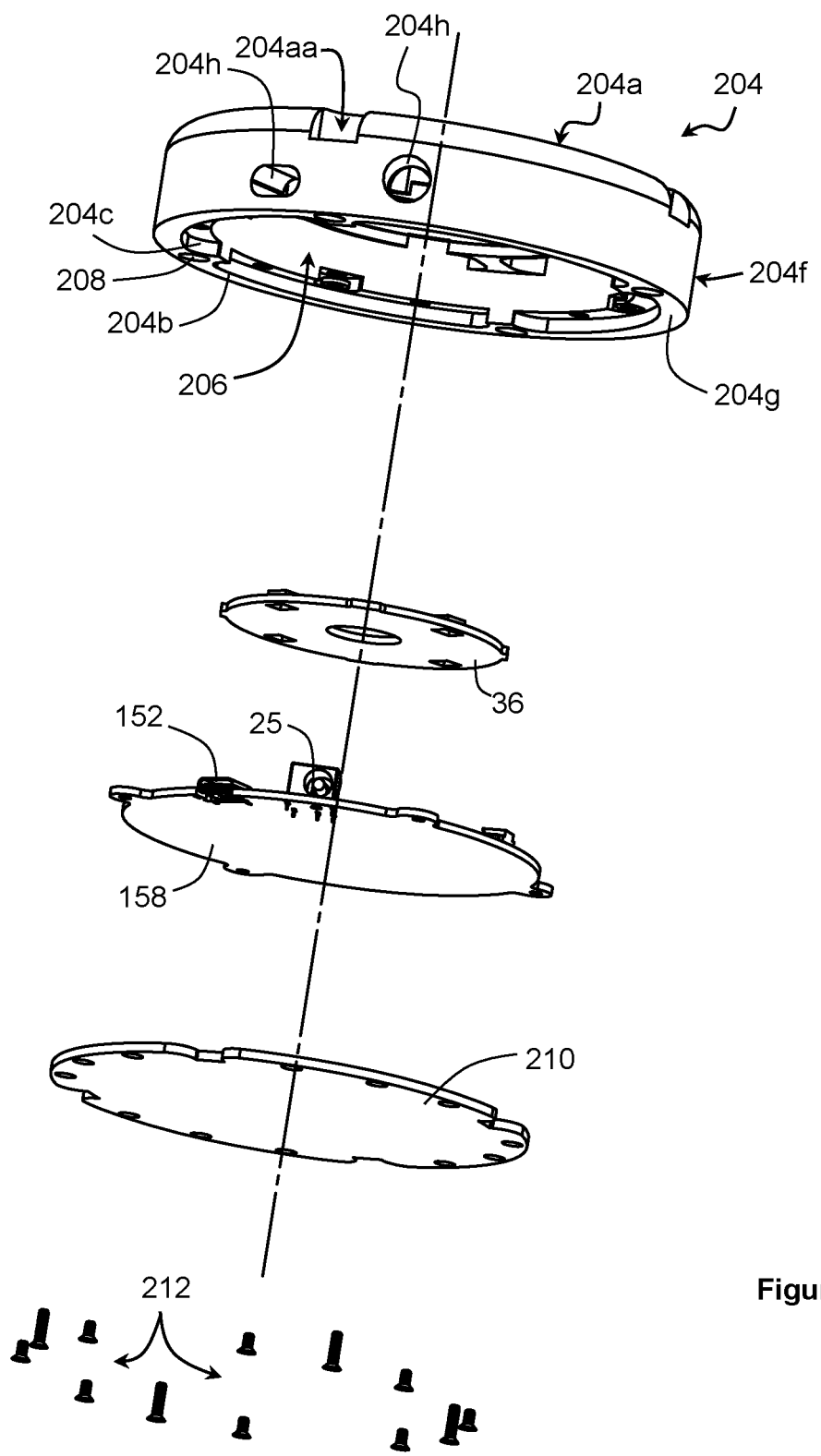
FIG. 10 illustrates an exploded view of the exemplary base plate of FIG. 8.

FIG. 9 illustrates a cross-sectional view of the exemplary swivel joint 12 and base plate 204 of FIG. 8. FIG. 10 illustrates an exploded view of the exemplary base plate 204 of FIG. 8. The base plate 204 has the top surface 204a (or the counterbored top surface 204aa) that may have formed thereon the holes 208 (extending through the circular side wall 204g to the bottom surface 204b) that receive fasteners for mounting the CMM 1 to the mounting surface MS. The base plate 204 may have ribs 204c formed around the mounting holes 208 for rigidity. In the illustrated embodiment, the base plate 204 has a circular lateral outer surface 204f disposed below the top surface 204a. The main printed circuit board 158 may be disposed inside the circular side wall 204g, within the circular lateral outer surface 204f, below the top surface 204a, and above the bottom surface 204b.

The base plate 204 has a cavity 206 formed thereon with an opening that opens towards the mounting surface MS. The main printed circuit board 158 is disposed horizontally within the cavity 206 below the top surface 204a (or the counterbored top surface 204aa). The base plate 204 has a circular lateral inner surface 204e that encircles the cavity 206. The main printed circuit board is disposed within the circular lateral inner surface 204e. The base plate 204 may have a cover plate 210 that attaches to the base plate 204 to cover the opening to the cavity 206. The cover plate 210 may, for example, be fastened to the base plate 204 using screws 212. The main printed circuit board 158 may be mounted to the cover plate 210 or to the base plate 204 also using screws 212. The base plate 204 may also have formed thereon side pockets or holes 204h to access the power jack 25, a USB connector 152, etc.

The swivel joint 12 may include housing 28, shaft 30, bearings 32, 34, encoder printed circuit board 36, encoder disk 38, and slip ring 40. The housing 28 of the joint 12 may be attached to the base plate 204 such that a portion of the housing 28, the bearing 32, and a portion of the shaft 30 are disposed somewhat inside the base plate, at least below the top surface 204a. The shaft 30 may have an internal opening 30a (e.g., 0.5" or 12.7 mm in diameter) that houses the slip ring 40.

The encoder printed circuit board 36 and the encoder disk 38 may be housed within the cavity 206 parallel to the main printed circuit board 158. This arrangement is particularly space-efficient and compact. In one embodiment, the gap between the main PCB 158 and the encoder PCB 36 is 6 mm. The taller components on the main PCB 158 may be placed near the edges of the main PCB 158 (that do not vertically overlap the encoder PCB 36) where the height is larger. In one embodiment, the gap between the main PCB 158 and the top inner surface 204d of the base plate 208 is 12 mm.

Figure 11:
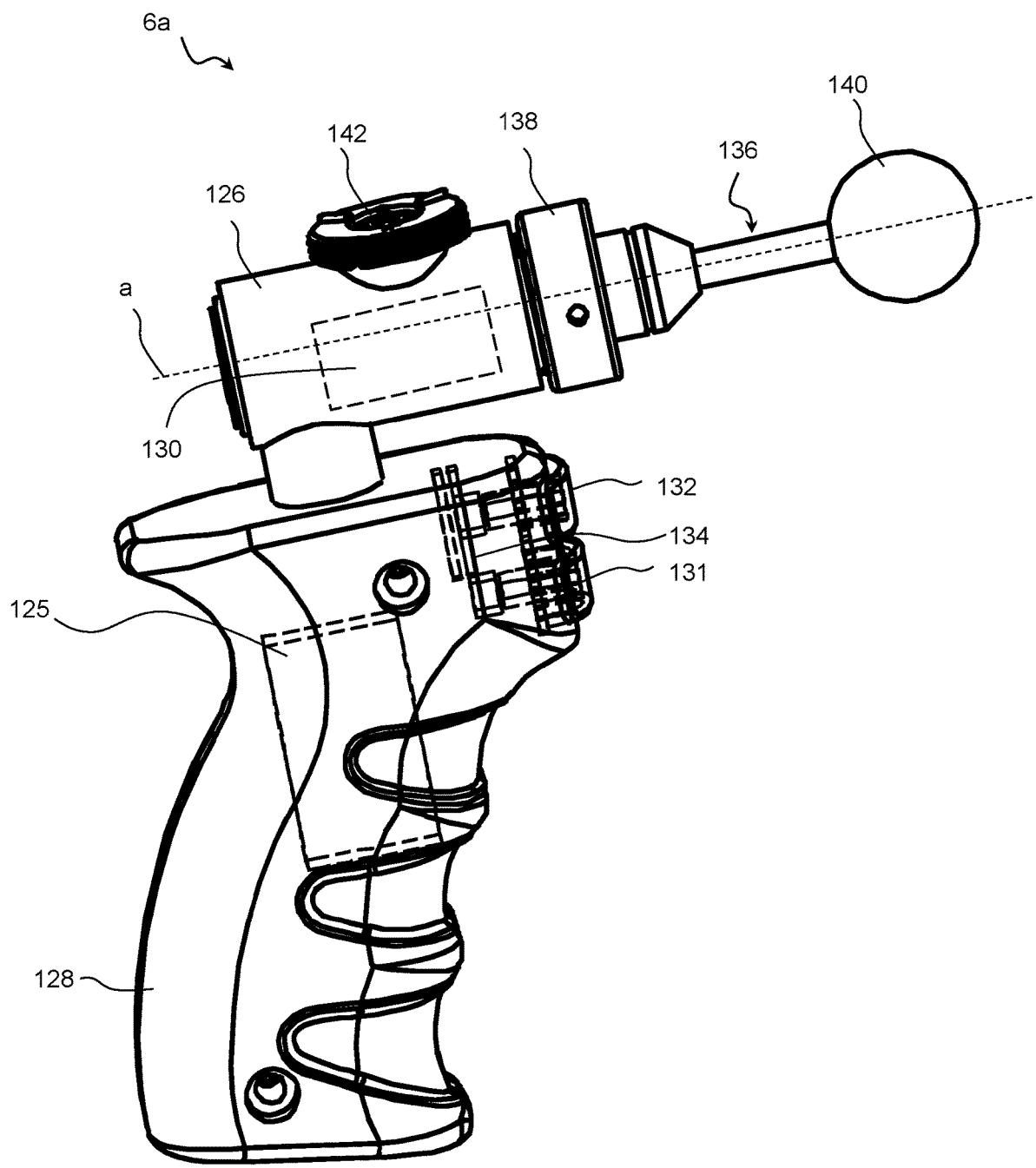
FIG. 11 illustrates a perspective view of an exemplary measurement probe of the CMM of FIGS. 1A-1D.

FIG. 11 illustrates a perspective view of an exemplary measurement probe 6a. Probe 6a includes a housing 126 that has an interior space for housing PCB 130 and a handle 128 that has an interior space for housing PCB 125. The housing 126 and the handle 128 are shown in FIG. 7A transparent for illustration purposes. Housing 126 operably couples to the swivel joint 24 (see FIGS. 1A-1D). Thus, the probe 6a rotates about the axis a of the swivel joint 24 and the swivel joint 24 detects the angle of rotation of the probe 6a about the axis a.

The measurement probe 6a may also include a probe stem assembly 136 having a probe connector 138 at one end and a probe 140 at the other end. The probe connector 138 connects to the housing 126 and the PCB 130. The probe stem assembly 136 may be a touch trigger assembly which triggers the capture of the position of the probe 140 when the probe 140 touches an object. The PCB 130 receives such a trigger signal and transmits it as described below. The probe stem assembly 136 may also house electronics such as, for example, an integrated circuit (e.g., EEPROM) having stored therein a serial number to uniquely identify a probe stem assembly 136 upon installation to the CMM 1.

Handle 128 may include two switches, namely a take switch 131 and a confirm switch 132. These switches may be used by the operator to take a measurement (take switch 131) and to confirm the measurement (confirm switch 132) during operation. The handle 128 is generally shaped to resemble a person's grip, which is more ergonomic than at least some prior art probes. The handle 128 may also house a switch PCB 134 to which the switches 131 and 132 may mount. Switch PCB 134 is electrically coupled to PCB 125 hosting components for processing signals from the switches 131 and 132. In one embodiment, the PCB 125 includes a wireless (e.g., Wi-Fi, Bluetooth, etc.) transmitter (instead of an electrical connection to the communication bus of the CMM 1) that wirelessly transmits take and confirm signals associated with the switches 131 and 132 to, for example, a host PC that generally controls the CMM 1. Wireless transmission of the take and confirm signals associated with the switches 131 and 132 significantly simplifies construction and wiring of the probe 6a.

The measurement probe 6a may also include an option port 142 to which optional devices such as, for example, a laser scanner (not shown) may be connected. The option port 142 provides mechanical connections for the optional devices to be supported by the measurement probe 6a. The option port 142 may also provide electrical connections for the optional devices to interface with the communication bus of the CMM 1.

Figure 12:
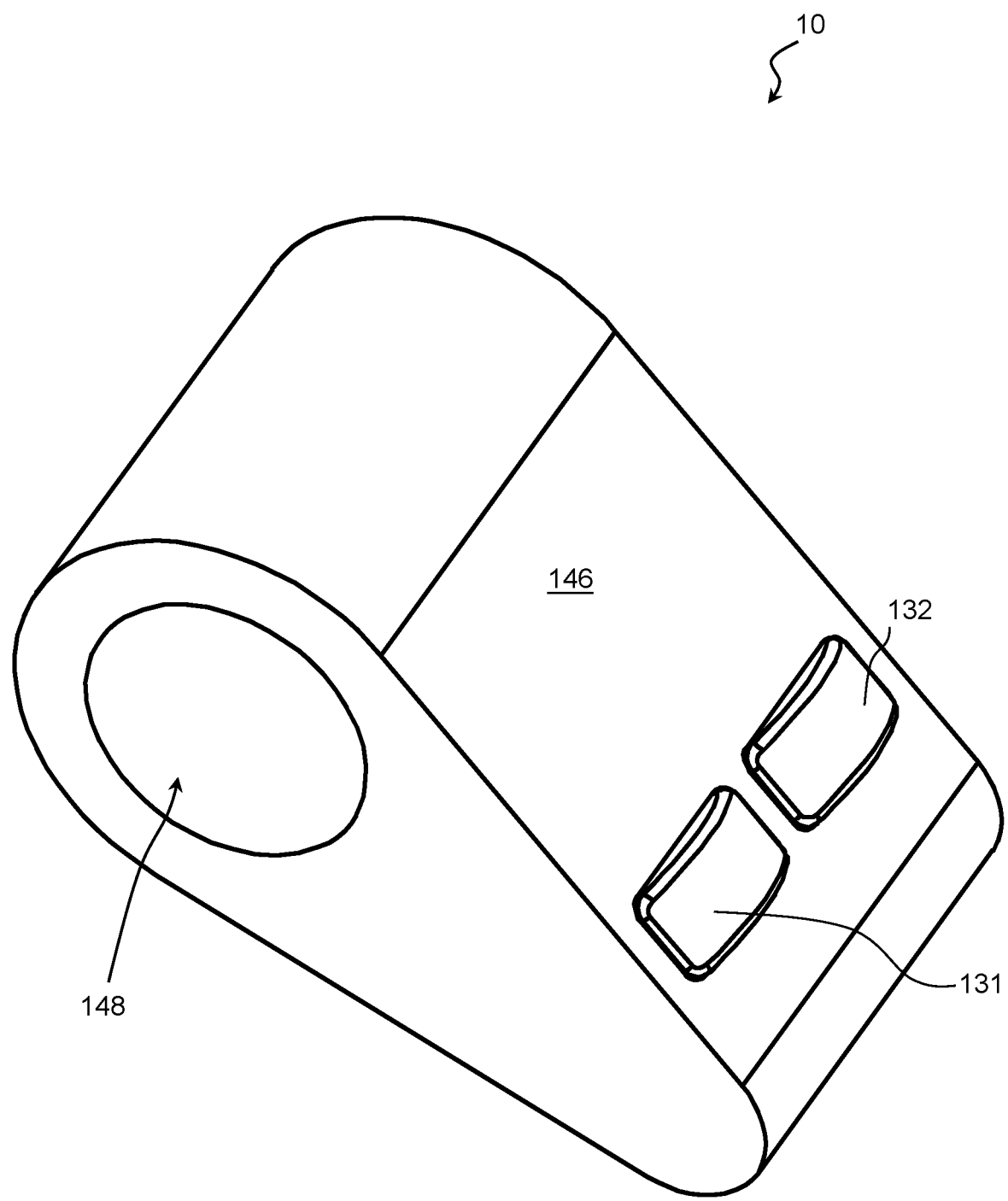
FIG. 12 illustrates a perspective view of an exemplary on-arm switch assembly of the CMM of FIGS. 1A-1D.

FIG. 12 illustrates a perspective view of an exemplary on-arm switch assembly 10. Switch assembly 10 includes a housing 146 that has opening 148 to mount (e.g., clamp) the switch assembly 10 to the arm segment 8 or, alternatively to the arm segment 9. The housing 146 has an interior space for housing a PCB. Similar to the probes 6 and 6b, the switch assembly 10 may include two switches, namely a take switch 131 and a confirm switch 132 that may be used by the operator to take a measurement (take switch 131) and to confirm the measurement (confirm switch 132) during operation. The position of the on-arm switch assembly 10, and more importantly of the switches 131 and 132, on the arm 2 instead of in the handles of the probe 6 allow for the operator to move and position the measurement probe 6 with one hand and to actuate the switches 131 and 132 with the other hand while supporting the arm. Prior art coordinate measurement machines required operators to position the measurement probe and actuate measurement switches in the probe with the same hand. This is not ergonomic. The on-arm switch assembly 10 is a significant advance in the coordinate measuring machine field because it provides a significantly more ergonomic solution as compared to prior art coordinate measurement machines.

The on-arm switch assembly 10 may also house a switch PCB 134 to which the switches 131 and 132 may mount or the on-arm switch assembly 10 may include a PCB that incorporates the functionality of both PCB 130 and switch PCB 134. In one embodiment, the PCB in the on-arm switch assembly 10 electrically connects to the communication bus of the CMM 1. In another embodiment, the PCB in the on-arm switch assembly 10 includes a wireless (e.g., Wi-Fi, Bluetooth, etc.) transmitter (instead of an electrical connection to the communication bus of the CMM 1) that wirelessly transmits take and confirm signals associated with the switches 131 and 132.

Figure 13:
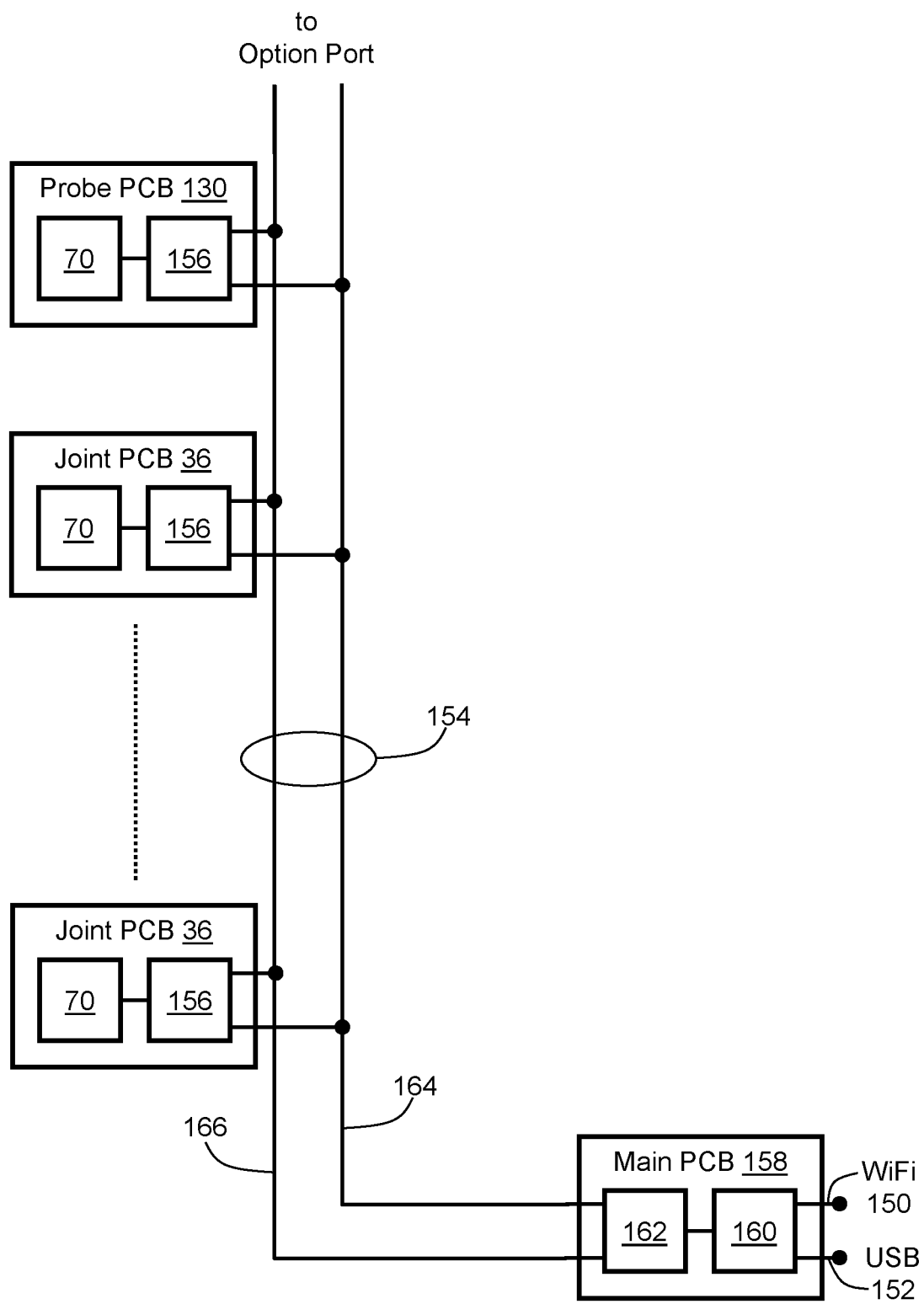
FIG. 13 illustrates a block diagram of exemplary electronics for the CMM of FIGS. 1A-1D.

FIG. 13 illustrates a block diagram of exemplary electronics for the CMM 1. The CMM 1 may include external communication interfaces such as a Universal Serial Bus (USB) 150 and wireless (Wi-Fi) 152. The CMM 1 may also include an internal communication bus (e.g., RS-485) 154. As discussed above, the various joints or axis of the CMM 1 each includes a PCB 36 which has installed thereon at least one transducer configured to output an angle signal corresponding to an angle of rotation of the joint. The PCB 36 may each include a processor 70 for receiving angle signals from the transducers and/or strain signals from the PCB 112 of the rotary damper assemblies 90. The PCB 36 may also include a transceiver 156 to interface with the bus 154.

The PCB 130 of the measurement probe 6, which may carry signals from the touch trigger probe 140, may also connect to the communication bus 154. The bus 154 may also connect to the option port 142 of the measurement probe 6 to communicate/control optional devices such as, for example, a laser scanner installed to the option port 142. The PCB 125 of the handle 128 may wirelessly transmit take and confirm signals associated with the switches 131 and 132.

The bus 154 terminates at a main PCB 158 preferably located at the base 4 or the base plate 204 of the CMM 1. The main PCB 158 includes its own main processor 160 and transceiver 162 for connecting to the bus 154. The main PCB 158 receives the angle signals from the transducers in the CMM 1 and output an agglomeration of the received angle signals via the Wi-Fi 150 or the USB 152 to a host PC such that the host PC may calculate the position of the measurement probe 6 based on this information and other information relating to the CMM 1 (e.g., location, length of arm segments, etc.) The internal bus 154 may be consistent with RS485. The bus 154 includes, from the main PCB 158's point of view, a pair of bidirectional wires 164 and 166 (A-B Pair, half duplex) or two pairs of unidirectional wires (A-B Pair and Y-Z pair, full duplex).

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A coordinate measurement machine (CMM) comprising:
   a manually-positionable articulated arm having first and second ends, the articulated arm including a plurality of arm segments and a plurality of rotary joints;
   an electrical circuit including a main printed circuit board and a plurality of encoder printed circuit boards, the electrical circuit having at least some portions disposed within the plurality of arm segments;
   at least one of the rotary joints from the plurality of rotary joints includes:
      first and second bearings;
      a shaft that engages an inner diameter of the first bearing and an inner diameter of the second bearing, the shaft configured to rotate about an axis of rotation of the first bearing and the second bearing;
      a housing having at least one port that engages at least one of an outer diameter of the first bearing and an outer diameter of the second bearing; and
      at least one transducer operably connected to an encoder printed circuit board from the plurality of printed circuit boards, the at least one transducer configured to output an angle signal corresponding to an angle of rotation of the shaft relative to the housing about the axis of rotation;
   the first end including a connector configured to connect to a measurement probe; and
   the second end including a base plate having a top surface having formed thereon holes configured to receive fasteners for mounting the CMM to a mounting surface, the base plate having a cavity formed thereon, wherein the main printed circuit board is disposed horizontally within the cavity below the top surface.

2. The CMM of claim 1, comprising:
   a cover plate operably attached to the base plate to cover an opening to the cavity.

3. The CMM of claim 1, wherein the housing of the at least one of the rotary joints is operably attached to the base plate such that at least one of the first and second bearings is disposed below the top surface of the base plate.

4. The CMM of claim 1, wherein an encoder printed circuit board, from the plurality of encoder printed circuit boards, associated with a rotary joint, from the plurality of rotary joints, is disposed within the cavity parallel to the main printed circuit board.

5. The CMM of claim 1, wherein the base plate has a circular lateral inner surface that encircles the cavity and the main printed circuit board is disposed within the circular lateral inner surface of the base plate.

6. The CMM of claim 1, wherein the base plate has a circular lateral outer surface disposed below the top surface, the main printed circuit board disposed within the circular lateral outer surface below the top surface.

7. A coordinate measurement machine (CMM) comprising:
   a manually-positionable articulated arm having first and second ends, the articulated arm including a plurality of arm segments and a plurality of rotary joints;
   an electrical circuit including a main printed circuit board and a plurality of encoder printed circuit boards;
   at least one of the rotary joints from the plurality of rotary joints includes:
      first and second bearings;
      a shaft that engages an inner diameter of the first bearing and an inner diameter of the second bearing, the shaft configured to rotate about an axis of rotation of the first bearing and the second bearing;
      a housing having at least one port that engages at least one of an outer diameter of the first bearing and an outer diameter of the second bearing; and
      at least one transducer operably connected to an encoder printed circuit board from the plurality of encoder printed circuit boards, the at least one transducer configured to output an angle signal corresponding to an angle of rotation of the shaft relative to the housing about the axis of rotation;
   the first end including a connector configured to connect to a measurement probe; and
   the second end including a base plate for mounting the CMM, the base plate having a cavity with a bottom opening, the main printed circuit board disposed horizontally within the cavity.

8. The CMM of claim 7, wherein the base plate has a circular side wall having formed thereon through-holes configured to receive fasteners for mounting the CMM to a surface, the main printed circuit board disposed within the circular side wall.

9. The CMM of claim 7, wherein the base plate has a circular side wall having formed thereon through-holes configured to receive fasteners for mounting the CMM to a mounting surface, the main printed circuit board is disposed within the cavity above a bottom surface of the base plate that engages the mounting surface and below a top opening of the through-holes.

10. The CMM of claim 7, wherein the main printed circuit board is disposed within the cavity above a bottom surface of the base plate that engages a mounting surface on which the CMM mounts.

11. The CMM of claim 7, wherein the housing of the at least one of the rotary joints is disposed relative to the base plate such that at least one of the first and second bearings is disposed below a top surface of the base plate.

12. The CMM of claim 7, comprising:
   a cover plate operably attached to the base plate to cover the bottom opening of the cavity.

13. The CMM of claim 7, wherein an encoder printed circuit board, from the plurality of encoder printed circuit boards, associated with a rotary joint, from the plurality of rotary joints, is disposed within the cavity parallel to the main printed circuit board.

14. The CMM of claim 7, wherein the base plate has a circular lateral inner surface that encircles the cavity and the main printed circuit board is disposed within the circular lateral inner surface of the base plate.

15. A coordinate measurement machine (CMM) comprising:
a manually-positionable articulated arm having first and second ends, the articulated arm including a plurality of arm segments and a plurality of rotary joints;
an electrical circuit including a main printed circuit board and a plurality of encoder printed circuit boards, the electrical circuit having at least some portions disposed within the plurality of arm segments;
at least one of the rotary joints from the plurality of rotary joints includes:
first and second bearings;
a shaft that engages an inner diameter of the first bearing and an inner diameter of the second bearing, the shaft configured to rotate about an axis of rotation of the first bearing and the second bearing;
a housing having at least one port that engages at least one of an outer diameter of the first bearing and an outer diameter of the second bearing; and
at least one transducer operably connected to an encoder printed circuit board from the plurality of printed circuit boards, the at least one transducer configured to output an angle signal corresponding to an angle of rotation of the shaft relative to the housing about the axis of rotation;
the first end including a connector configured to connect to a measurement probe; and
the second end including a base plate for mounting the CMM to a mounting surface, the base plate shaped like a disk, the main printed circuit board disposed horizontally inside the disk.

16. The CMM of claim 15, wherein the base plate has a circular side wall having formed thereon through-holes configured to receive fasteners for mounting the CMM to the mounting surface, the main printed circuit board disposed inside the circular side wall.

17. The CMM of claim 15, wherein the base plate has a circular side wall having formed thereon through-holes configured to receive fasteners for mounting the CMM to the mounting surface, the main printed circuit board is disposed above a bottom surface of the base plate that engages the mounting surface and below a top opening of the through-holes.

18. The CMM of claim 15, wherein the housing of the at least one of the rotary joints is disposed relative to the base plate such that at least one of the first and second bearings is disposed within the disc.

19. The CMM of claim 15, a cover plate operably attached to the base plate to cover an opening at the bottom of the disc, the main printed circuit board operably mounted to the cover plate.

20. The CMM of claim 15, wherein an encoder printed circuit board, from the plurality of encoder printed circuit boards, associated with a rotary joint, from the plurality of rotary joints, is disposed inside the disc parallel to the main printed circuit board.

\* \* \* \* \*